(12) United States Patent
Primsch

(10) Patent No.: US 6,192,370 B1
(45) Date of Patent: Feb. 20, 2001

(54) METHOD AND SYSTEM FOR RAPID MEMORY-RESIDENT PROCESSING OF TRANSACTIONAL DATA

(75) Inventor: Jürgen Primsch, Berlin (DE)

(73) Assignee: SAP Aktiengesellschaft, Walldorf (DE)

( * ) Notice: Under 35 U.S.C. 154(b), the term of this patent shall be extended for 0 days.

(21) Appl. No.: 09/100,581

(22) Filed: Jun. 19, 1998

(51) Int. Cl.[7] .................................................. G06F 17/30
(52) U.S. Cl. .............................. 707/103; 707/3; 707/4; 707/202
(58) Field of Search .................. 707/103, 3, 4, 707/200

(56) References Cited

U.S. PATENT DOCUMENTS

| | | | |
|---|---|---|---|
| 5,694,598 | * | 12/1997 | Durand et al. ..................... 707/103 |
| 5,734,885 | * | 3/1998 | Agrawal et al. ...................... 707/3 |
| 5,734,887 | * | 3/1998 | Kingberg et al. ...................... 707/4 |
| 5,873,083 | * | 2/1999 | Jones et al. ............................. 707/4 |

FOREIGN PATENT DOCUMENTS

| | | |
|---|---|---|
| 2253500 | 9/1992 | (GB). |
| 9634350 | 10/1996 | (WO). |

OTHER PUBLICATIONS

Database Inspec 'Online! Iees, Stevenage, GB, Bernstein, p.a. Et Al.: "The Microsoft Repository" 23rd Int'l. Conf. On Very Large Databases, Athens, Aug., 26–29, 1997.

Nelson, M.L. Et Al.: "A Relational Object–Oriented Management System". Proceedings of the Annual Int'l Phoenix Conf. On Computers and Communications, US, Los Alamitos, IEEE Comp. Soc. Press, Bd. Conf. 9, pp 319–323., No Date.

Barsalou, T.: "Updating Relational Databases Through Object–Based Views" Sigmod Record, US, Assoc. For Computing Machinery, NY, pp248–257., No Date.

"Storing Query Objects by Type in a Relational Database", IBM Technical Disclosure Bulletin, US, IBM Corp., NY, vol. 32, No. 4B, Sep. 1989, p. 14.

* cited by examiner

*Primary Examiner*—John Breene
*Assistant Examiner*—Cheryl Lewis
(74) *Attorney, Agent, or Firm*—Chadbourne & Parke LLP

(57) ABSTRACT

A system and method for enabling the real-time processing of large quantities of transactional data by providing a hybrid object-relational database management system for storing such data in optimized data structures in a large, main memory, wherein stored procedures and functions of user-defined types are executed in this main memory as methods of COM objects implemented in C++. The optimized data structures are stored as complex objects in the DBMS. This DBMS comprises a traditional relational DBMS as well as separate containers for storing these complex objects. The complex objects themselves are instances of persistent C++ classes. Instances are referred to by a unique Object Identifier (OID) and stored in the aforementioned separate containers. An SQL query from the client application calls the stored procedure via the method name of the COM object, a copy of which is made available in a main memory address space and dynamically linked to the DBMS process.

36 Claims, 26 Drawing Sheets

FIG_3

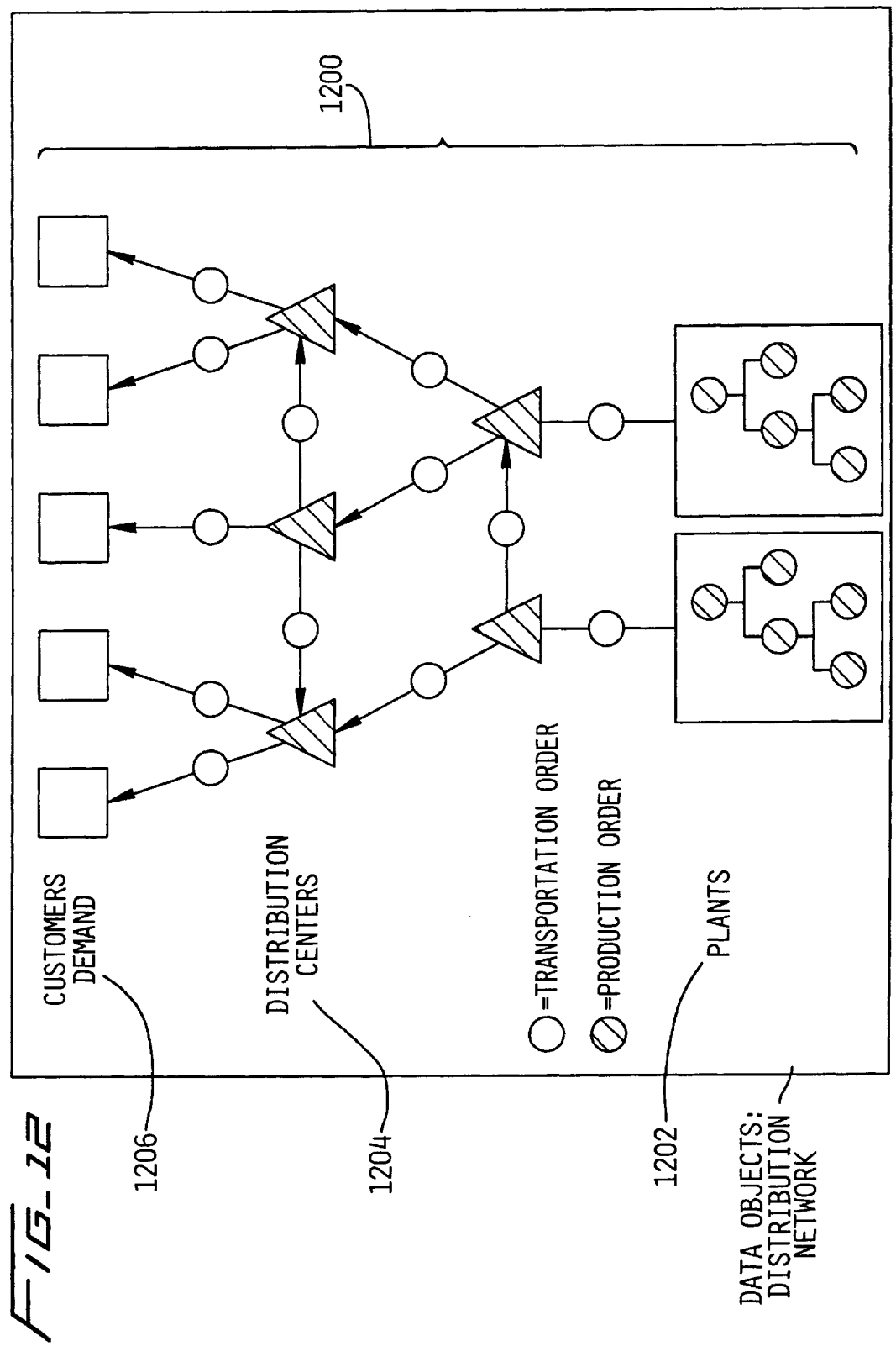

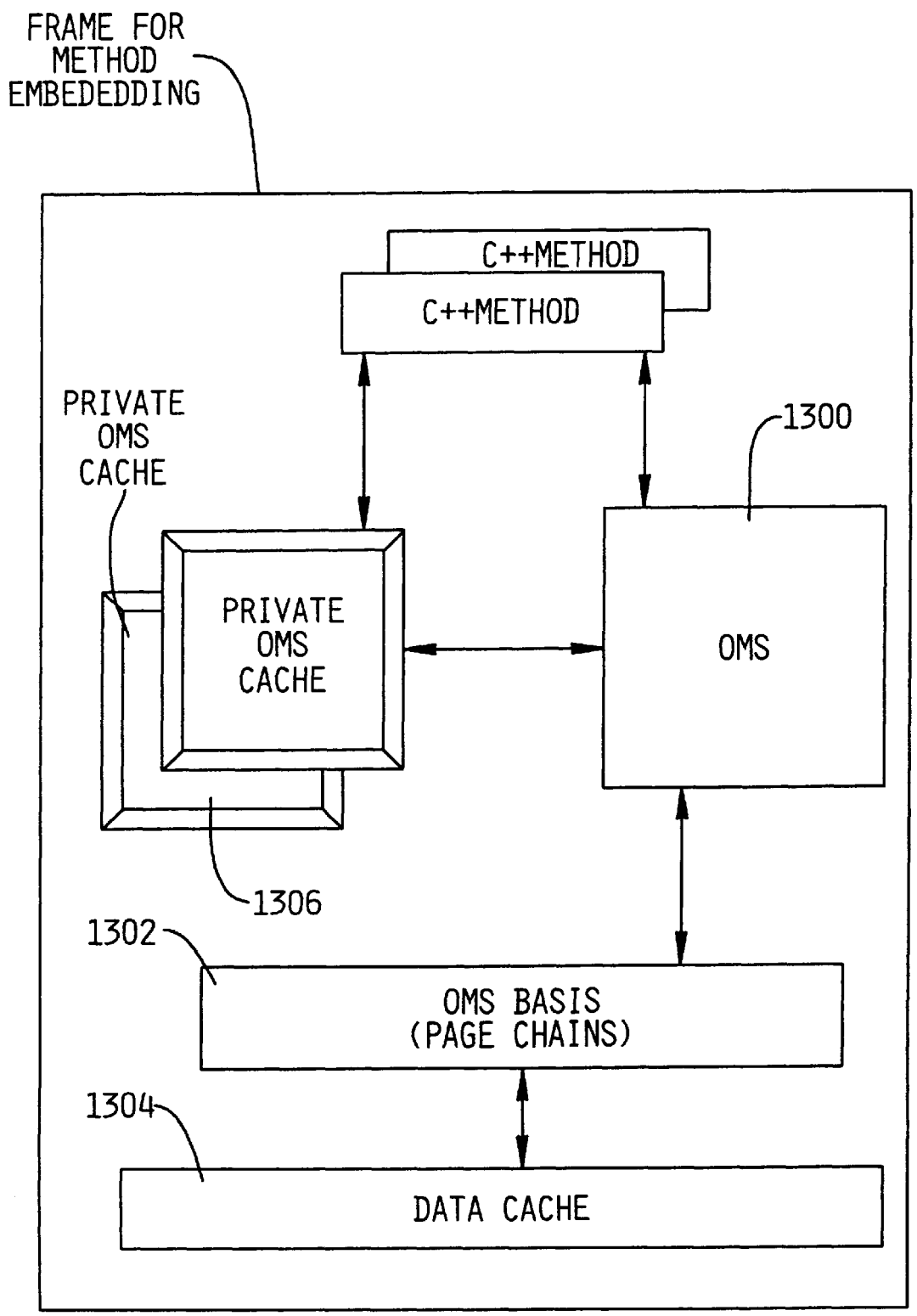
FIG_13

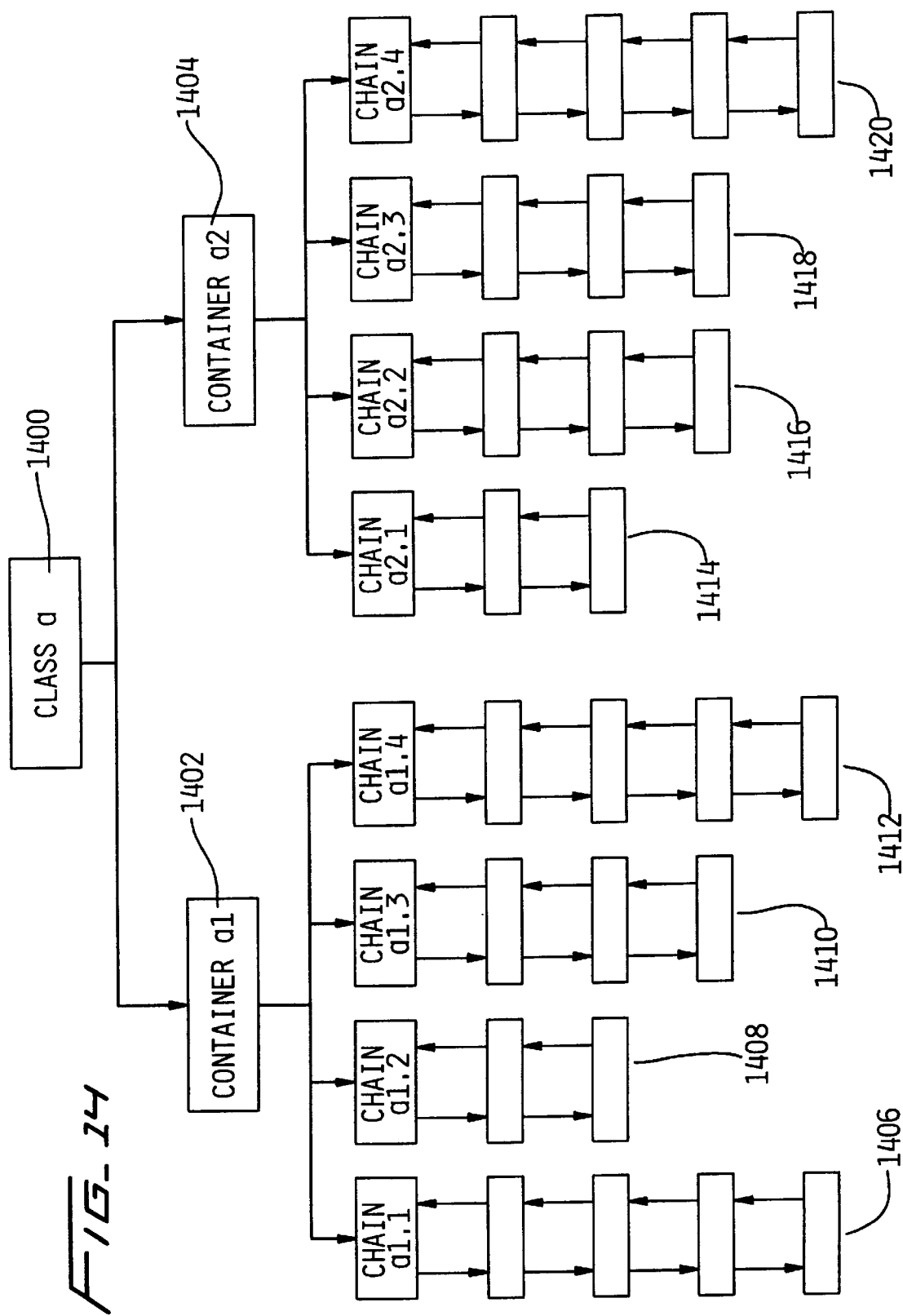

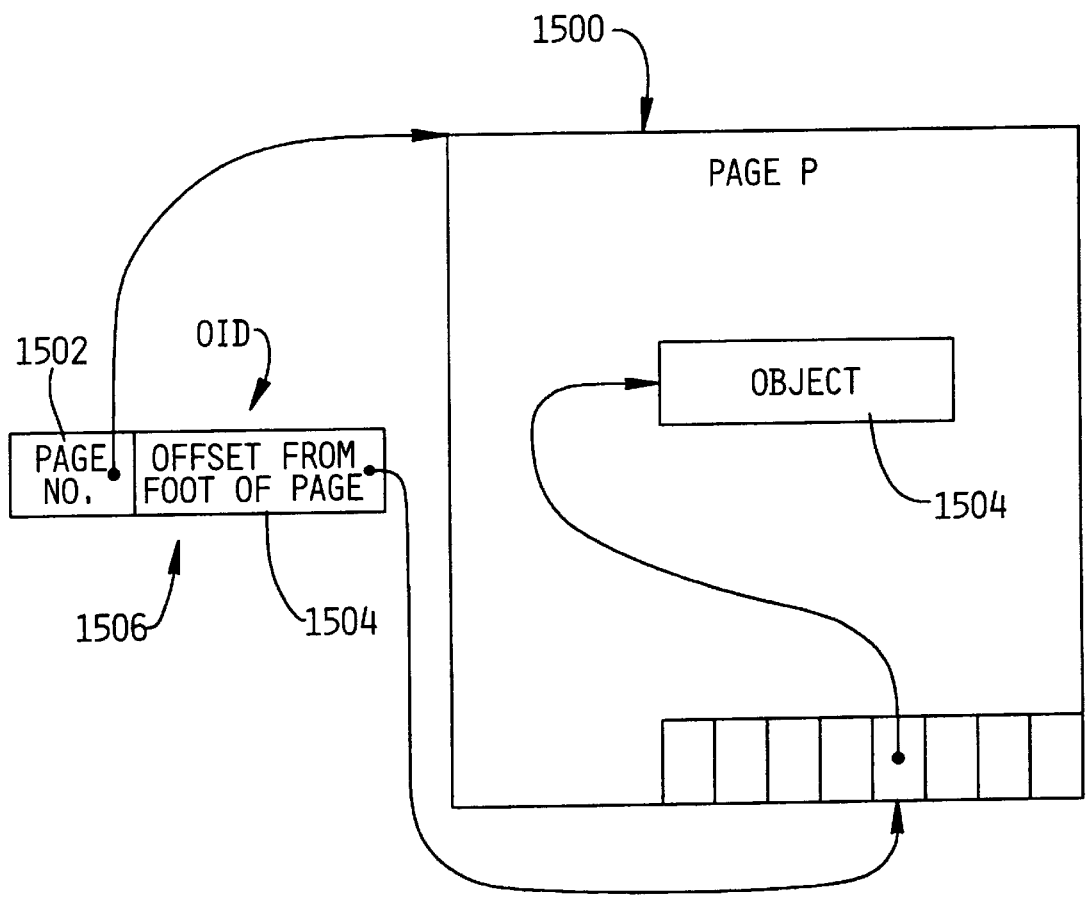
FIG_15

FIG_16

| DATA PAGE NUMBER | DATA PAGE OFFSET | CLASS ID | VERSION |
|---|---|---|---|

- 1602 — DATA PAGE NUMBER: REFERENCE THE DATA PAGE OF THE OBJECT; HASHED TO A DATA CACHE ADDRESS
- 1604 — DATA PAGE OFFSET: OFFSET OF THE OBJECT ON THE DATA PAGE
- 1606 — CLASS ID : THE CLASS THE OBJECT BELONGS TO
- 1608 — VERSION : ENABLING REUSABILITY OF OBJECT FRAMES

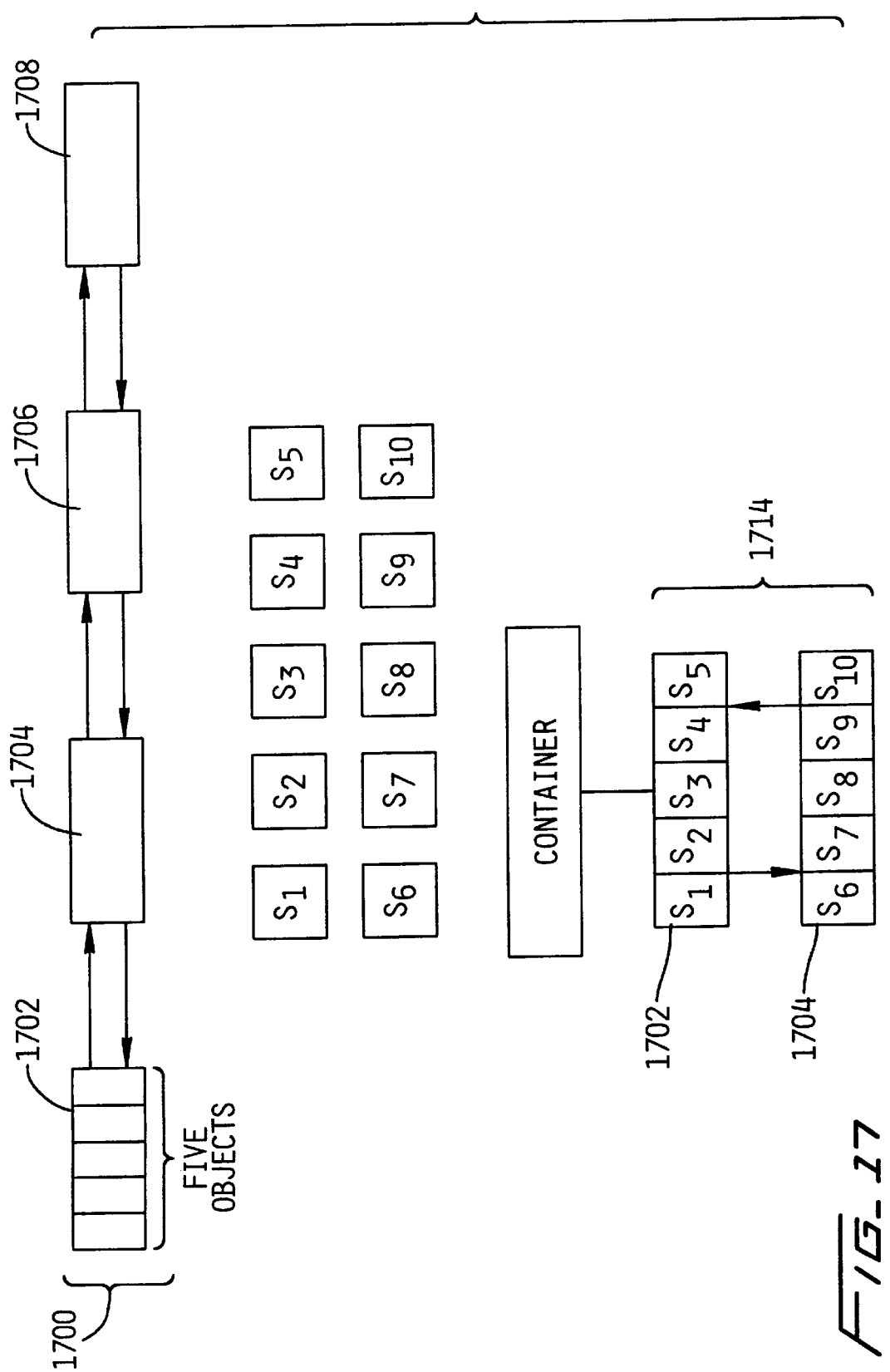

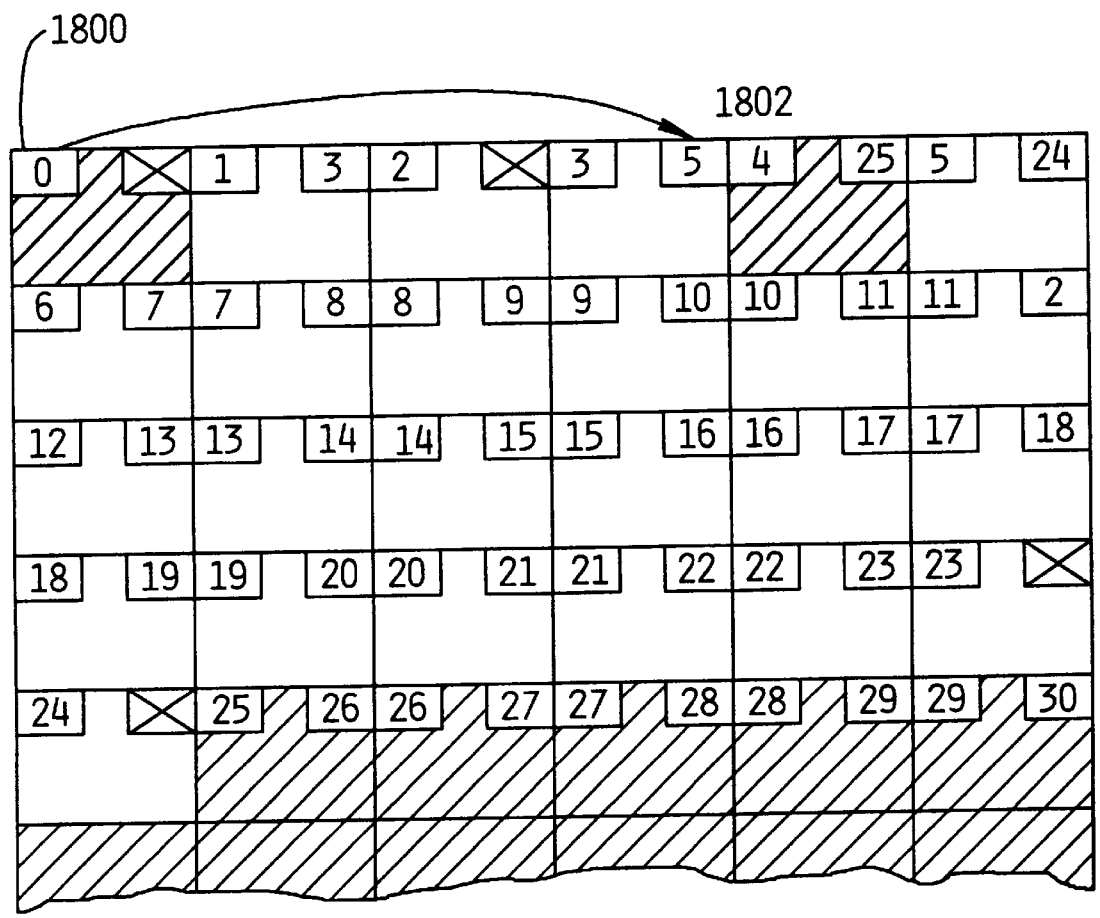
FIG_18

FIG_21

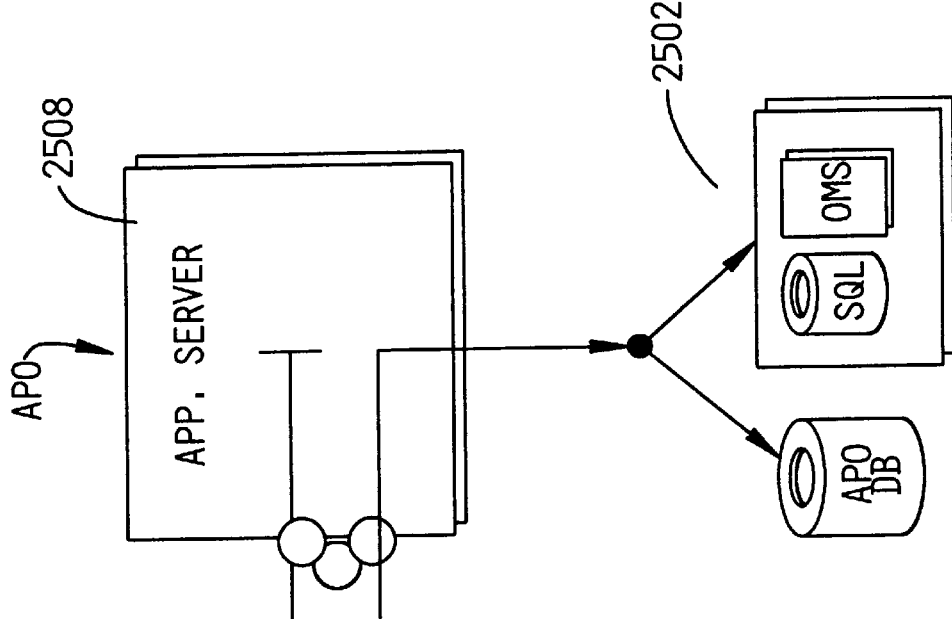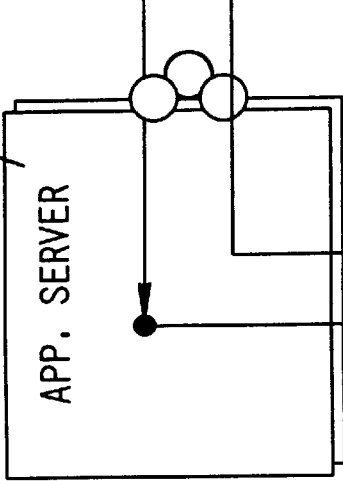
FIG. 25

METHOD AND SYSTEM FOR RAPID MEMORY-RESIDENT PROCESSING OF TRANSACTIONAL DATA

FIELD OF THE INVENTION

The present invention relates generally to a method of data storage, retrieval, and processing in a transactional system. More particularly, the invention relates to a method for integrating relational and object-oriented functionality in order to execute functions on stored data on a real-time basis.

BACKGROUND OF THE INVENTION

In the computing industry, it is common to store data in commercial database systems and to retrieve such data using a database management system. There are two general types of database management systems, relational and object-oriented. Relational database systems are good for managing large amounts of data, while object-oriented database systems are good for expressing complex relationships among objects. Relational database systems are good for data retrieval but provide little or no support for data manipulation, while object-oriented systems excel at data manipulation but provide little or no support for data query and retrieval. Depending on the task at hand, there are various systems available which are suited for particular tasks. In order to manage simple data without queries, a traditional database system is not even necessary. A simple file system will suffice. In order to manage simple data with queries, a relational database system would be ideal. If the subject data is complex without queries, an object-oriented database system would be used. Finally, for the case where the subject data is complex and requires query capabilities, one would want to use an object-relational database management system.

Attempts to combine the inherent functionalities have been made; however, as the two models are fundamentally different, integrating the two is quite difficult. Relational database systems are based on two-dimensional tables in which each item appears in a row. Relationships among the data are expressed by comparing the values stored in these tables. The object model is based on the tight integration of code and data, flexible data types, and references. Object-oriented databases have their origins in the object-oriented programming paradigm. In this paradigm, users are concerned with objects and operations on those objects. For example, instead of having to thing of a "DEPT tuple" plus a collection of corresponding "EMP tuples" that include "foreign key values" that reference the "primary key value" in that "DEPT tuple," the user should be able to think directly of a department object that contains a corresponding set of employee objects.

It is a basic tenet of the OO approach that everything is an object. Some objects are primitive and immutable (integers, strings, etc.) Other objects—typically user-created—are more complex and mutable. These more complex objects correspond to variables of arbitrary internal complexity. Every object has a type (the OO term is a class). Individual objects are sometimes referred to as object instances. An intrinsic aspect of any given type consists of the set of operators or functions (the OO term is "methods") that can be applied to objects of that type. Furthermore, all objects are encapsulated. This means that the representation or internal structure of a given object is not visible to the users of that object. Instead, users know only that the object is capable of performing certain functions. The advantage of encapsulation is that it allows the internal representation of objects to be changed without requiring any of the applications that use those objects to be rewritten. In other words, encapsulation implied data independence. Every object has a unique identity called the OID (object ID) which can be used as addresses for pointers from other parts of the database.

Relational database systems support a small, fixed collection of data types (e.g. integers, dates, and strings), which has proven adequate for traditional application domains such as administrative data processing. In many application domains, however, much more complex kinds of data must be handled. Typically, this complex data has been stored in Operating System file systems or specialized data structures, rather than in a DBMS. Examples of domains with complex data include computer aided design and modeling (CAD/CAM), multimedia repositories, and document management. As the amount of data grows, the many features offered by a DBMS for data management—for example, reduced application development time, concurrency control and recovery, indexing support, and query capabilities—become increasingly attractive and necessary. In order to support such applications, a DBMS must support complex data types. Object-oriented concepts have strongly influenced efforts to enhance database support for complex data. As mentioned before, there exist, in the prior art, relational database management systems which support these functions with regard to simple data. A relational DBMS could conceivably store complex data types. For example, images, videos, etc. could be stored as blobs ("basic large objects") in current relational systems. A blob is just a long stream of bytes, and the DBMS's support consists of storing and retrieving blobs in such a manner that a user does not have to worry about the size of the blob; a blob can span several pages. All further processing of the blob has to be done by the user's application program, in the host language in which the SQL language is embedded. This solution is not efficient because we are forced to retrieve all the blobs in a collection even if most of them could be filtered out of the answer by applying a user-defined function within the DBMS. Although object-oriented databases of the prior art support storage of complex data, they fail to provide the query and indexing capabilities to manage such complex data. There is a need for a database management system which can provide the features and functionality of traditional relational database management systems, but for use with complex data types. As a result of this need, there has been a drive towards the development of object-relational database management systems.

Object relational databases can be thought of as an attempt to extend relational database systems with the functionality necessary to support a broader class of applications, and in many ways, provide a bridge between relational and object-oriented paradigms. There are several object-relational database management systems (ORDBMSs) in the market today. These include the Informix Universal Server, UniSQL, and 02. The approach taken by the current trends in object relational technology is to extend the functionality of A existing relational DBMSs by adding new data types. Traditional systems offered limited flexibility in the data types available. Data is stored in tables, and the type of each field value is limited to be a simple atomic type. This limited type system has been extended in three ways: user-defined abstract types, constructed types, and reference types. Collectively, these are referred to as complex types. As an example, take a JPEG image. This type is not one of a typical DBMS's built-in types, but can be defined by a user in an ORDBMS, to store image data compressed using the JPEG standard. Allowing users to define arbitrary new data types is a key feature of ORDBMSs. The ORDBMS allows users to store and retrieve objects of type jpeg_image, just like an object of any other type, such as integer. New data types usually need to have type-specific operations defined by the user who creates them. For example, one might define operations on an image data type such as compress, rotate, shrink, and crop. The combination of the data type and its associated methods is called an Abstract Data Type (ADT). The label "abstract" is applied to these data types because the database system does not need to know how an ADT's data is stored, nor how the ADT's methods work. It merely needs to know what methods are available and the input and output types for the methods. Hiding of ADT internals is called encapsulation. When the object is especially large, Object Identifications become significant. Storing copies of a large value in multiple constructed type objects may use much more space than storing the value once and referring to it elsewhere through reference type objects. This additional storage requirement can affect both disk usage and buffer management.

Large ADT objects complicate the layout of data on disk. This problem is well understood, and has been solved in essentially all ORDBMSs and OODBMSs. User-defined ADTs can be quite large. In particular, they can be bigger than a single disk page. Large ADTs, like blobs, require special storage, typically in a different location on disk from the tuples that contain them. Disk-based pointers are maintained from the tuples to the objects they contain.

The final issue in the prior art of ORDBMSs is efficiency. When complex objects are stored as blobs in a purely relational database management system, the entire object must be retrieved from memory and transferred to the client. Any and all processing of the object must be done by the client itself. However, in an ORDBMS, performance is improved because methods are executed by the server, not the client. As a trivial example, consider the query, "Find all books with more than 20 chapters." In a traditional relational DBMS, books might be represented as blobs and the client will have to retrieve each book and scan it to decide if it meets the criteria. In contrast, with proper OO support, the server can execute the "number of chapters" method and only those books will be transmitted to the client.

This is one aspect of performance in the sense that only the required data is retrieved and transmitted to the client. Another aspect of efficiency has to do with address spacing. If the storage system runs in a different address space from the user program, then an address space switch must occur to process this command. Because of the address space switch, the command will run two to three orders of magnitude slower than in the non-persistent case. Such a performance hit is unacceptable to users, which is why persistent storage systems are designed to execute in the same address space as the user program. Avoiding an address space change provides much higher performance. The advantage to using a persistent language is that in the persistent language world, updates are very "lightweight," that is, they take a very small amount of time. As a result, expressing updates in a low-level language such as C++ is fundamentally different than in a high-level notation such as SQL. In C++, or in any other third generation programming language, updates are fundamentally lightweight, that is, they modify a single storage location.

A final aspect of performance is the data transfer between the DBMS and the address space where the function will execute. In the prior art, data is transported from the DBMS which is stored in a hard disk or some other similar device, to the application. This type of data transfer places an enormous burden on network resources and causes unacceptable delays. Disk Input/Output (I/O) is source of major delays in processing speeds in the prior art. In a situation where there are large amounts of transactional data in a traditional relational DBMS, it is desirable to perform complex calculations on this data. The limiting factor on such data manipulation is speed and performance. In the prior art, large amounts of data are retrieved by the DBMS and provided as input to a function which executes on the data and returns an output value. However, I/O bottlenecks occur when the data needs to be transferred from disk to memory. For example, when large amounts of transactional data must be operated upon in order to provide real-time or close to real-time data analysis, the actual transactional data must be transferred from the DBMS and delivered to the client where the computational process is executed. This has traditionally resulted in significant delays. The present invention aims to correct this deficiency and allow for high speed, efficient processing of data retrieved from a database on a real-time basis.

The prior discussion can be applied in the context of Enterprise Resource Planning systems. These transactional systems are employed by companies to automate and manage its business process on a daily basis. These online transaction processing systems are designed to provide integrated processing of all business routines and transactions. They include enterprise-wide, integrated solutions, as well as specialized applications for individual, departmental functions. They mirror all of the business-critical processes of the enterprise—finance, manufacturing, sales, and human resources. The R/2 and R/3 Systems from SAP AG are on example of such a transactional system.

It is advantageous to be able to analyze the transactional data generated by such systems. In the prior art, companies have employed computers to analyze business process data and provide decision support. Traditionally, data from the transactional systems were batch uploaded to a data warehouse. Analysis was performed on the data from the data warehouse. The analysis was not being performed in a real-time basis. The present invention aims to correct that deficiency.

It is an object of the present invention to provide a system and method that can perform complex manipulations on large amounts of transactional data in real-time.

It is a further object of the present invention to eliminate the I/O bottlenecks which traditionally occur when large amounts of transactional data is transferred to the client for processing.

It is a further object of the present invention to provide a system and method enabling the storage of transactional data in optimized data structures providing suitable representations of complex data structures, like networks or trees, based on object references.

It is a further object of the present invention to keep the transactional data stored in optimized data structures correlated to the transactional data being updated on the transactional system.

It is a further object of the present invention to provide a system and method whereby complex objects can be stored in an object-oriented environment.

It is a further object of the present invention to provide a system whereby said complex objects can be queried using traditional relational database techniques and the SQL language.

It is a further object of the present invention to provide a system where the complex objects are subject to sophisticated transaction management systems as in a relational environment.

SUMMARY OF THE INVENTION

The present invention provides a system and method for the performance of complex data processing on a real-time basis. In an exemplary embodiment, the system includes one or more clients (e.g. terminals or PCs) connected via a network to an application server. The application server contains a very large main memory in which a hybrid object-relational database system is executed. The database system comprises a traditional relational database management system whose functionality is extended by allowing the introduction of complex data types, namely persistent C++ classes and stored procedures. These complex data types can be accessed by SQL means through User-Defined Types and User-Defined Functions. Transactional data is stored in optimized data structures as complex objects in the same large main memory. Separate storage containers are provided for storing these complex objects. Each complex object itself is an instance of the persistent C++ class. When an object is generated, a unique object identifier (OID) is created for that object. The OID serves as a pointer to the complex object that is being stored in the separate storage container. The invention further comprises an object management system (OMS) for defining, manipulating, and retrieving persistent C++ objects using object management C++ methods and traditional relational database transaction management techniques.

For each persistent C++ class, there are associated stored procedures. The stored procedures are executed as methods of COM objects implemented in C++. The methods are registered in a library and are dynamically linked to the address space where the database process is executing. These methods are written in C++ and are designed to operate on the data stored as complex objects which are instances of the persistent C++ class.

In general operation, one or more clients request a data processing operation to be performed on a set of data stored as complex objects. The ORDBMS and the data itself are all stored in the large main memory. In this way, I/O bottlenecks are eliminated as there is no need for heavy data transfer and performance advantages are achieved. The stored procedure is also made available in the same main memory address. The stored procedure can access this complex object through the object identifier via an intermediate GET method. The object identifier is converted into a main memory address where said object is stored. A copy of the persistent C++ object is then made available in the same main memory address space of the stored procedure. As a result, the stored procedure is executed in the same address space where the DBMS is executing, thereby providing additional performance advantages for operations involving complex analysis of massive data stores. Prior to the present invention, complex queries consumed large amounts of resources, making it inefficient to use actual operational data from transactional systems without significant delays. The present invention aggregates transactional data into the proposed ORDBMS and performs complex analysis through the registered functions in the same address space where the ORDBMS process is executing, thereby providing an enhanced level of performance.

BRIEF DESCRIPTION OF THE DRAWINGS

FIG. 12 is a diagram of a distribution network which is suitable for object oriented data modeling.

FIG. 13 is a diagram of the architecture of the Object Management System.

FIG. 14 is a diagram of the architecture of object data storage in the OMS Basis.

FIG. 15 is a diagram of a page memory layout with a data object stored within.

FIG. 16 is a diagram of the structure of the Object ID in the preferred embodiment.

FIG. 17 depicts the storage of objects in the page memory layout of the main memory in the present invention.

FIG. 18 depicts a sequence of pages in a page memory layout of the present invention.

FIG. 25 is step two of the data synchronization means of the present invention.

DETAILED DESCRIPTION OF A PREFERRED EMBODIMENT

The following description will focus on the presently preferred embodiment of the present invention, which is operative in a network environment executing client/server applications. The present invention, however, is not limited to any particular application or environment. Instead, those skilled in the art will find that the present invention may be advantageously applied to any application or environment where real-time processing of large volumes of transactional data is desirable. The description of the exemplary embodiment which follows is for the purpose of illustration not limitation.

Figure 1:
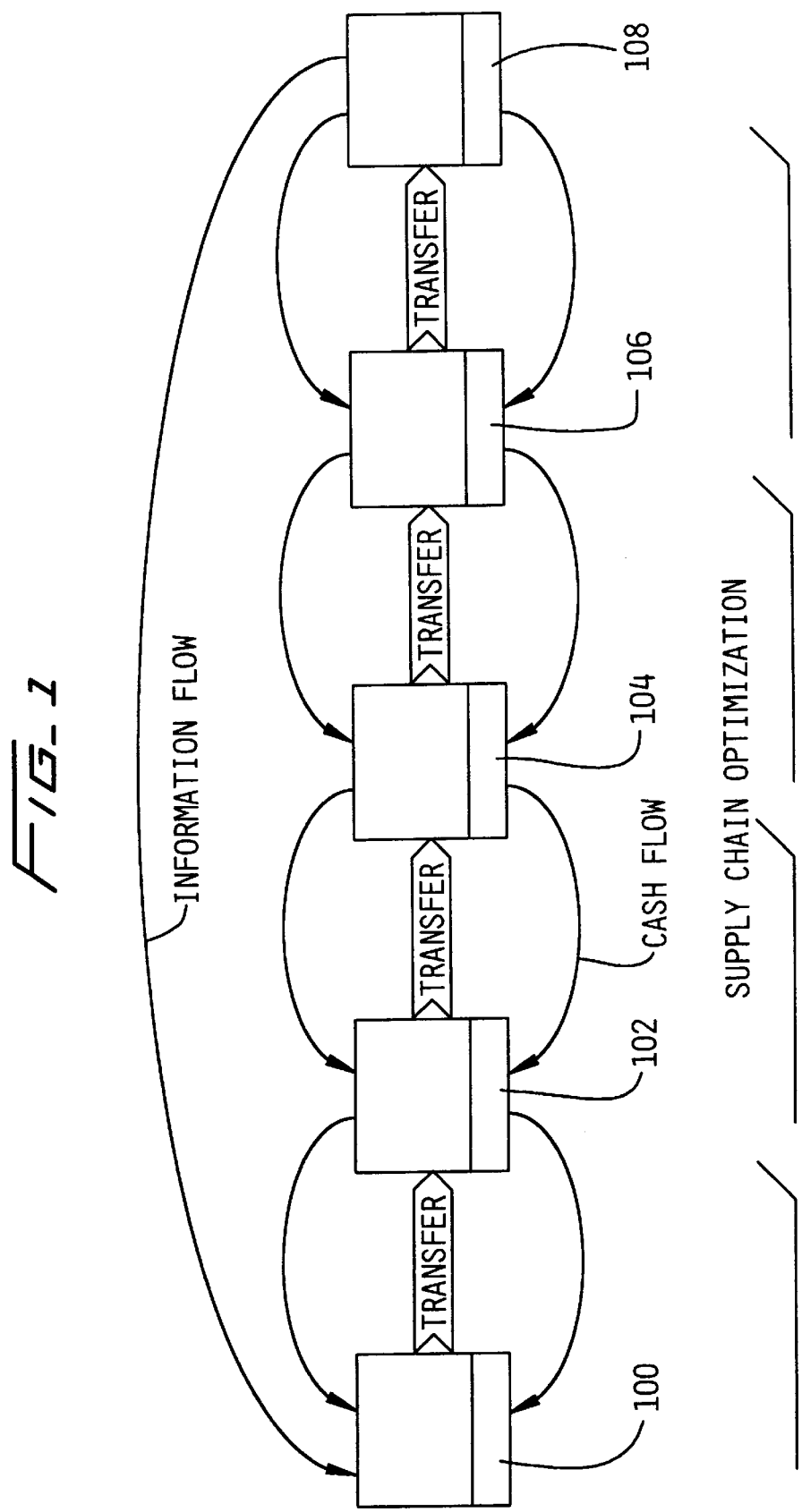
FIG. 1 is a diagram of an environment suitable for the application of the present invention.
Figure 2:
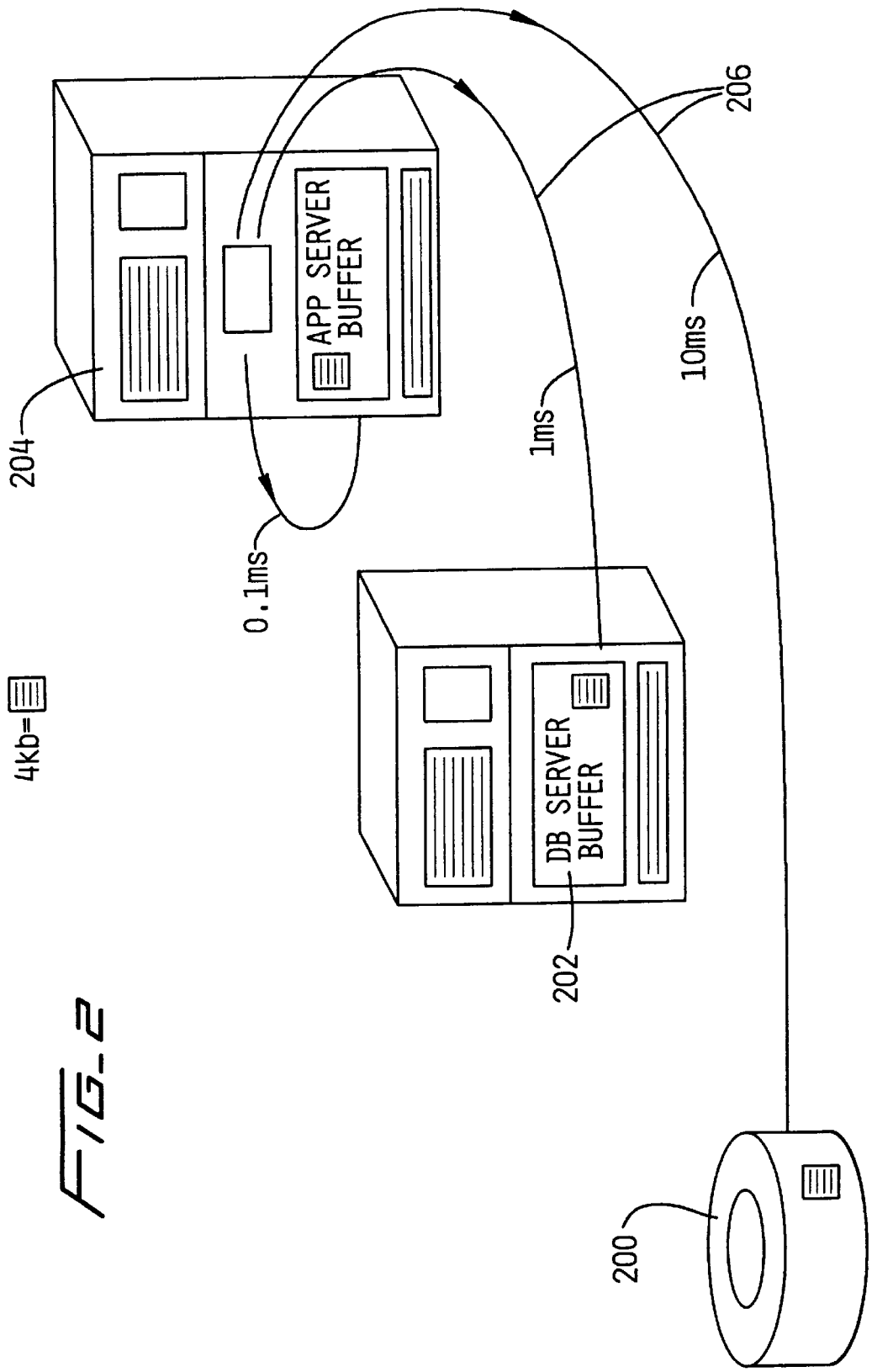
FIG. 2 is a diagram of the prior art.

FIG. 1 shows a diagram of a supply chain environment suitable for the application of the present invention. The flow of goods from supplier 100 to consumer 108, with the intermediate nodes at manufacturer 102, distributor 104, and retail operation 106, should be maximized in order to achieve optimal cost solutions. The present invention enables said optimization calculations in real time. FIG. 2 depicts the processing methods of the prior art. Traditionally, transactional data is transferred either from hard disk 200 or database server buffer 202 to application server 204. As can be seen from the figure, the time for such transfer 206 is fairly significant. The present invention reduces these numbers significantly.

Figure 3:
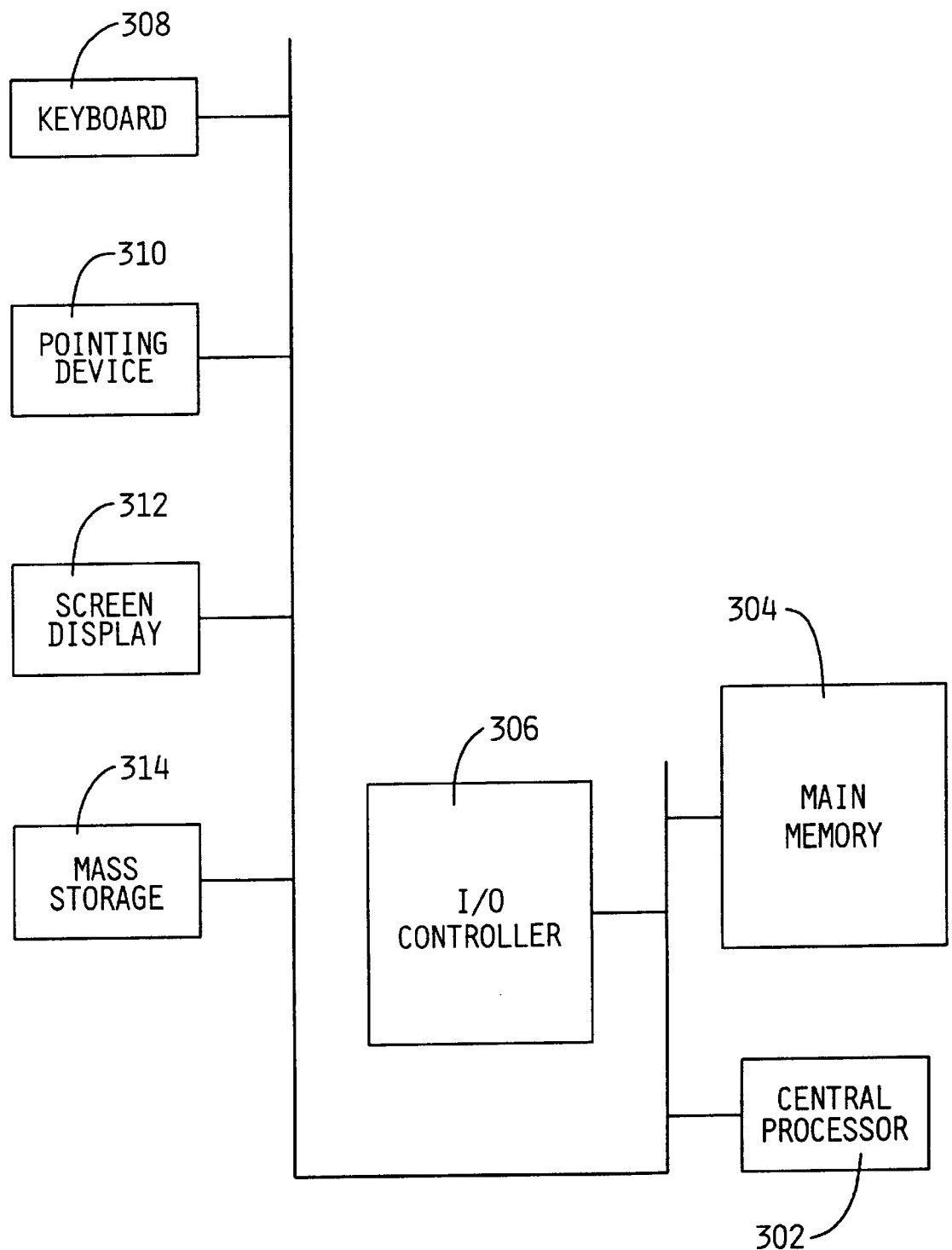
FIG. 3 is a diagram of a computing system in which the present invention can be implemented.

The invention may be embodied on a computer system such as the system of FIG. 3, which comprises central processor 302, main memory 304, input/output controller 306, keyboard 308, pointing device 310, screen display 312, and mass storage 314 (e.g. hard or fixed disk, removable disk, optical disk, magneto-optical disk, or flash memory).

Figure 4:
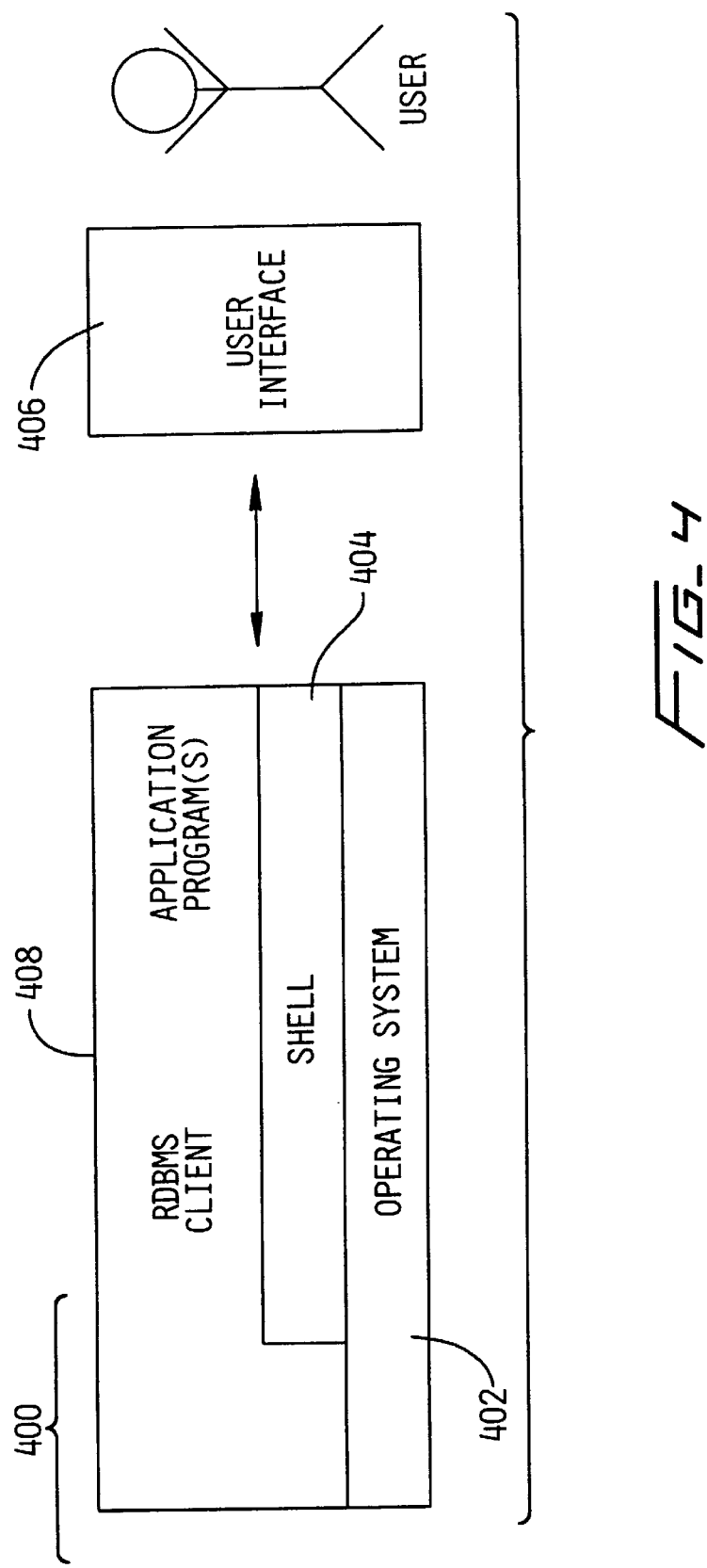
FIG. 4 is a block diagram illustrating a software subsystem for controlling the operation of computer system of FIG. 3.

Illustrated in FIG. 4, a computer software system is provided for directing the operation of the computer system. Software system which is stored in system memory 400 and on mass storage or disk memory includes a kernel or operating system 402, which in this specific embodiment is Windows NT and shell 404. One or more application programs, such has application software may be loaded (transferred from disk into main memory) for execution by the system. The system also includes user interface 406 for receiving user commands and data as input and displaying result data as output. In the present embodiment, as shall be seen, the liveCache application software includes hybrid object-relational database system 408.

The client may be any one of a number of database front-ends including Powerbuilder, dbase, Paradox, Microsoft Access, etc. In an exemplary embodiment, the front-end will include SQL access drivers for accessing SQL database server tables in a client/server environment.

Figure 5:
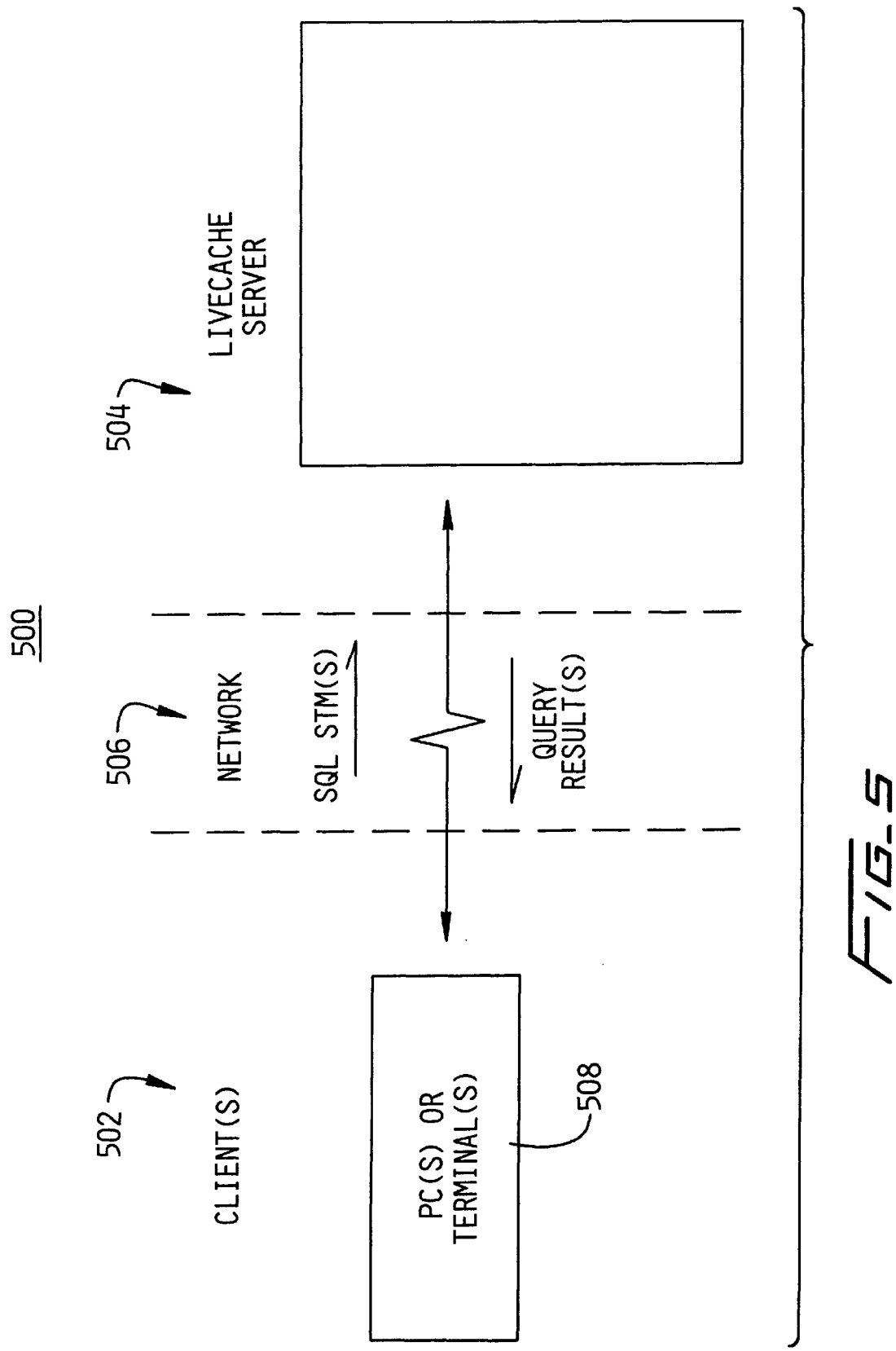
FIG. 5 is a block diagram of a client/server system in which the present invention if preferably embodied.

While the present invention may operate within a single computer (such as FIG. 3), the present invention is preferably embodied in a multi-user computer system, such as a client/server system. FIG. 5 illustrates the general structure of a client/server system of the preferred embodiment. As shown, system 500 comprises one or more clients 502 connected to a liveCache server 504 via network 506. Specifically, client(s) 502 comprise one or more standalone terminals 508 connected to a the system residing on the server using a conventional network.

LiveCache server 504 generally operates as an independent process running under a server operating system, particularly Microsoft NT (Microsoft Corp of Redmond, Wash) on the server. Network 506 may be any one of a number of conventional network systems, including a Local Area Network (LAN) or Wide Area Network (WAN), as is known in the art (e.g. using Ethernet, IBM Token Ring, or the like). Network 506 includes functionality for packaging client calls in the well-known (SQL) Structured Query Language) together with any parameter information into a format suitable for transmission across a cable or wire for delivery to liveCache server 504.

Figure 6:
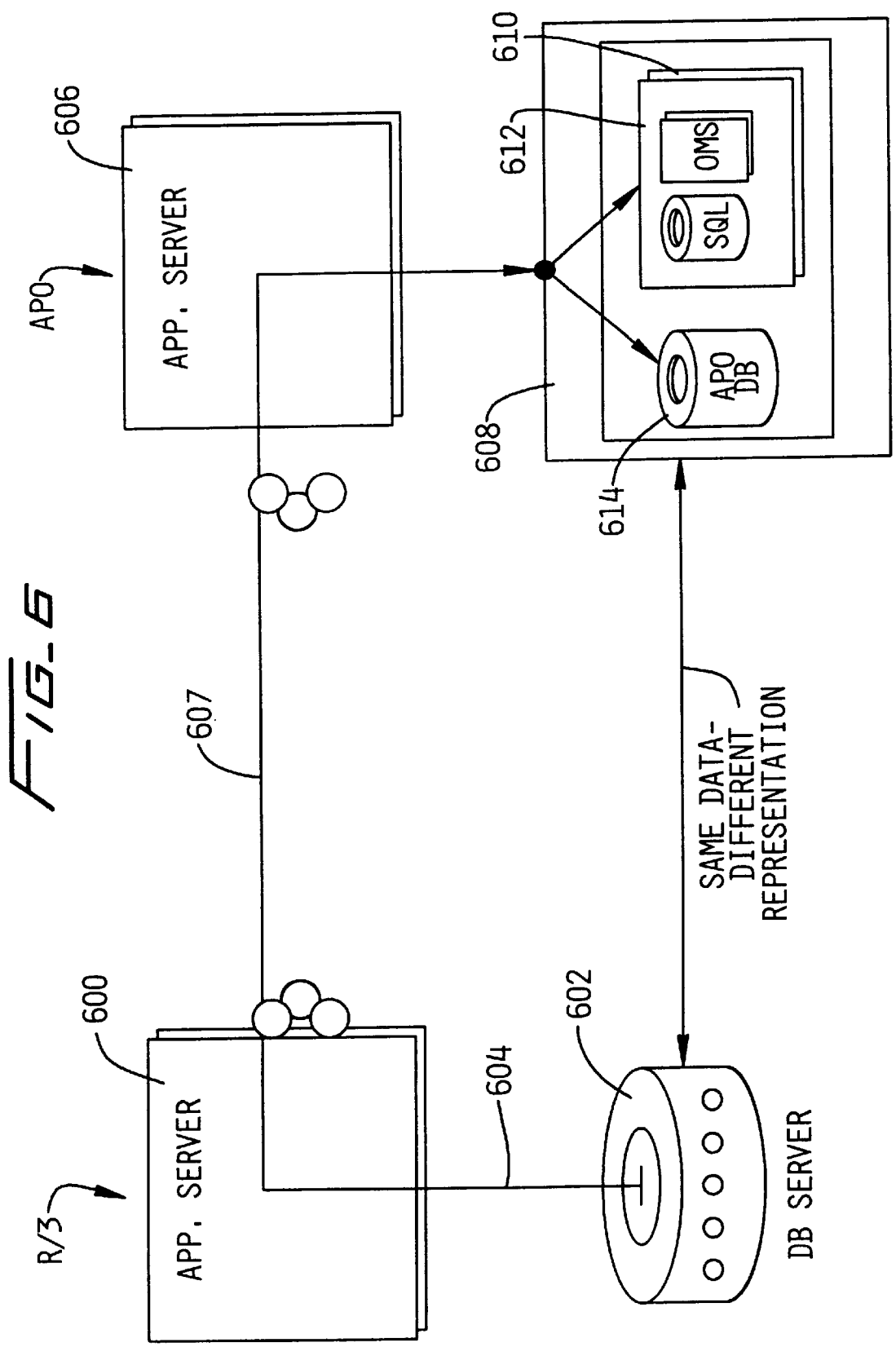
FIG. 6 is a diagram of the preferred implementation of the present invention.

FIG. 6 is a block diagram of the framework in which the liveCache server is implemented in the preferred embodiment. ERP system 600 (which, in the preferred embodiment, is R/3 from SAP AG of Walldorf, Germany) is connected to main ERP database server 602 via data link 604. ERP system 600 provides transactional management for the day-to-day operations of the enterprise. Said transactions are written to main ERP database server 602. ERP system 600 is also connected to application server 606. There is a data link 607 between ERP system 602 and application server 606. On liveCache server 608, there is a very large main memory 610 in which liveCache application 612 and included database system 614 is resident. Operational data is stored in a traditional relational structure in the ERP database 602.

Figure 7:
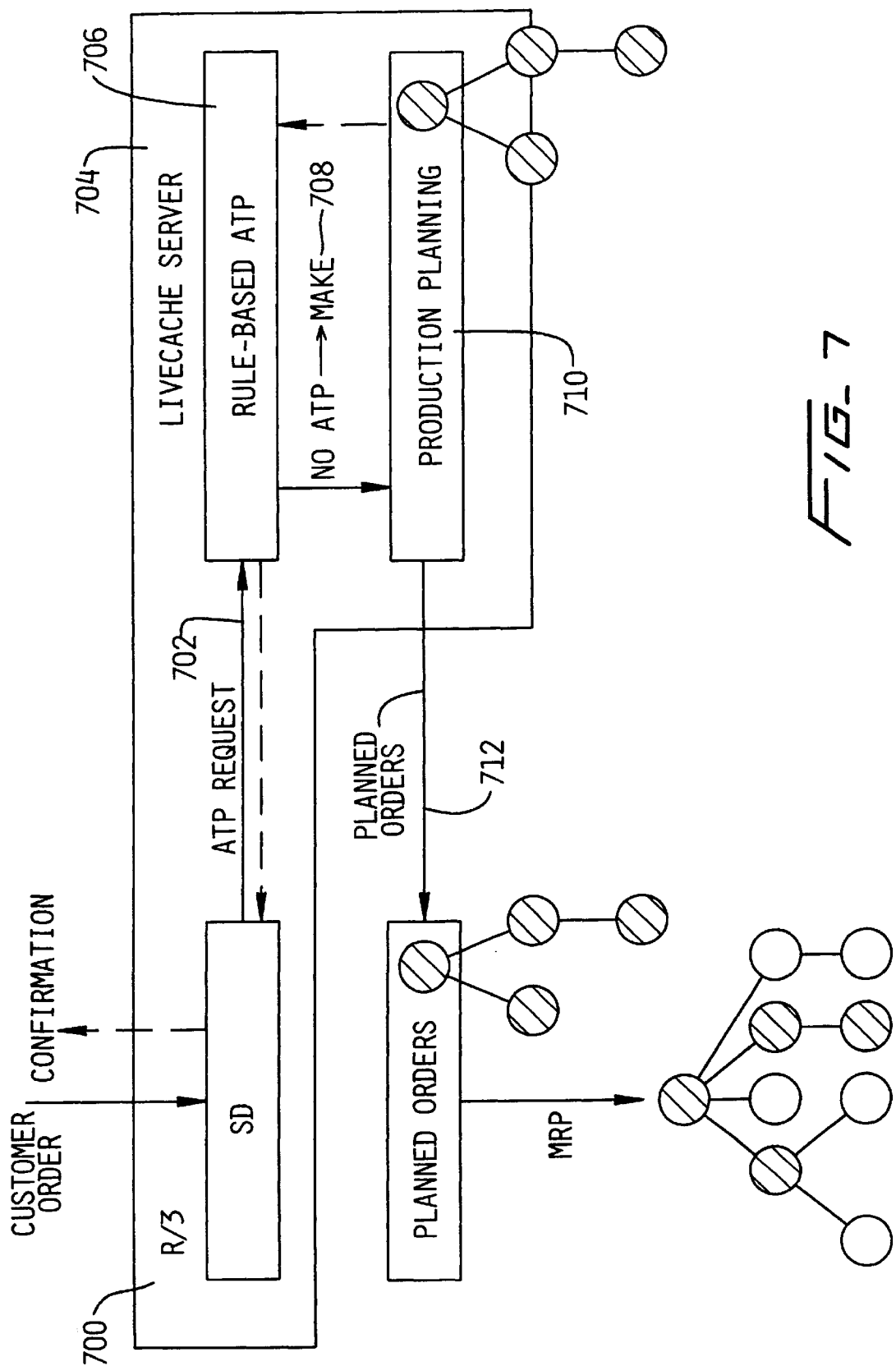
FIG. 7 is a flow diagram of a sample transaction initiated in the preferred embodiment of the present invention.

FIG. 7 depicts a sample order which shows the flow of information. The user enters the order request in ERP system 700, the request is transmitted 702 to liveCache server 704 where rule-based ATP function 706, an example of a possible stored procedure, checks to see if the product is available. If it is not 708, production planning function 710, another example of a possible stored procedure, creates planned order 712 and transmits it back to ERP system 700 where it is executed.

Figure 8:
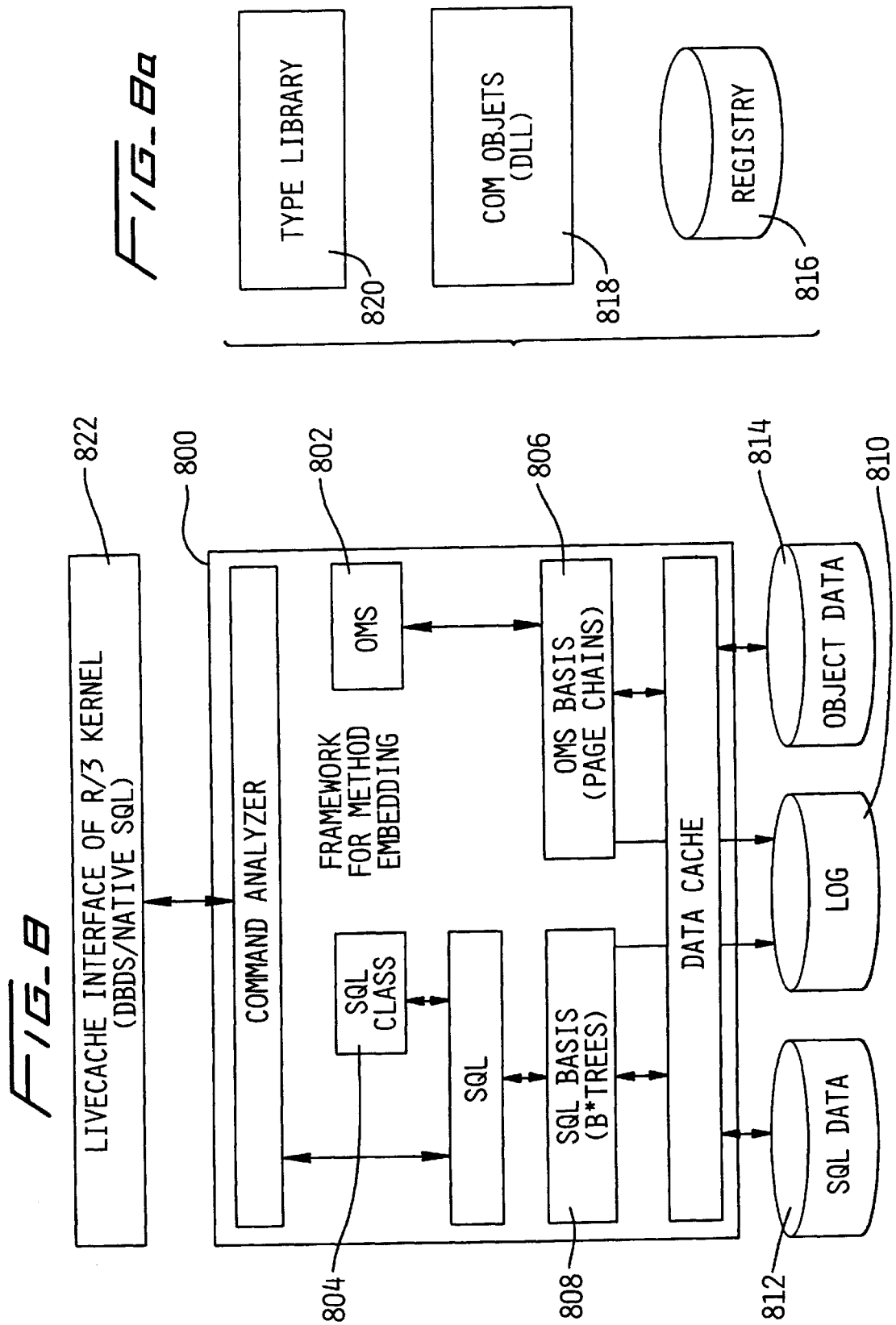
FIG. 8 is a diagram of the architecture of the preferred embodiment of the present invention.

FIG. 8 shows a detailed diagram of the liveCache itself. Main memory 800 contains the liveCache application. LiveCache application is comprised of OMS 802, SQL class 804, OMS basis 806, SQL basis containing the B*trees 808, and data log 810, which records the transaction management functions of the OMS as well as the SQL basis. The memory also contains relational data storage mechanism 812, as well as object data storage mechanism 814. The COM objects are registered in registry 816 and stored in COM storage container 818. Type library 820 maintains the information about the interfaces which the COM object provides for input parameters. Interface 822 is the means by which stored procedures are called and input parameters are provided.

Figure 9:
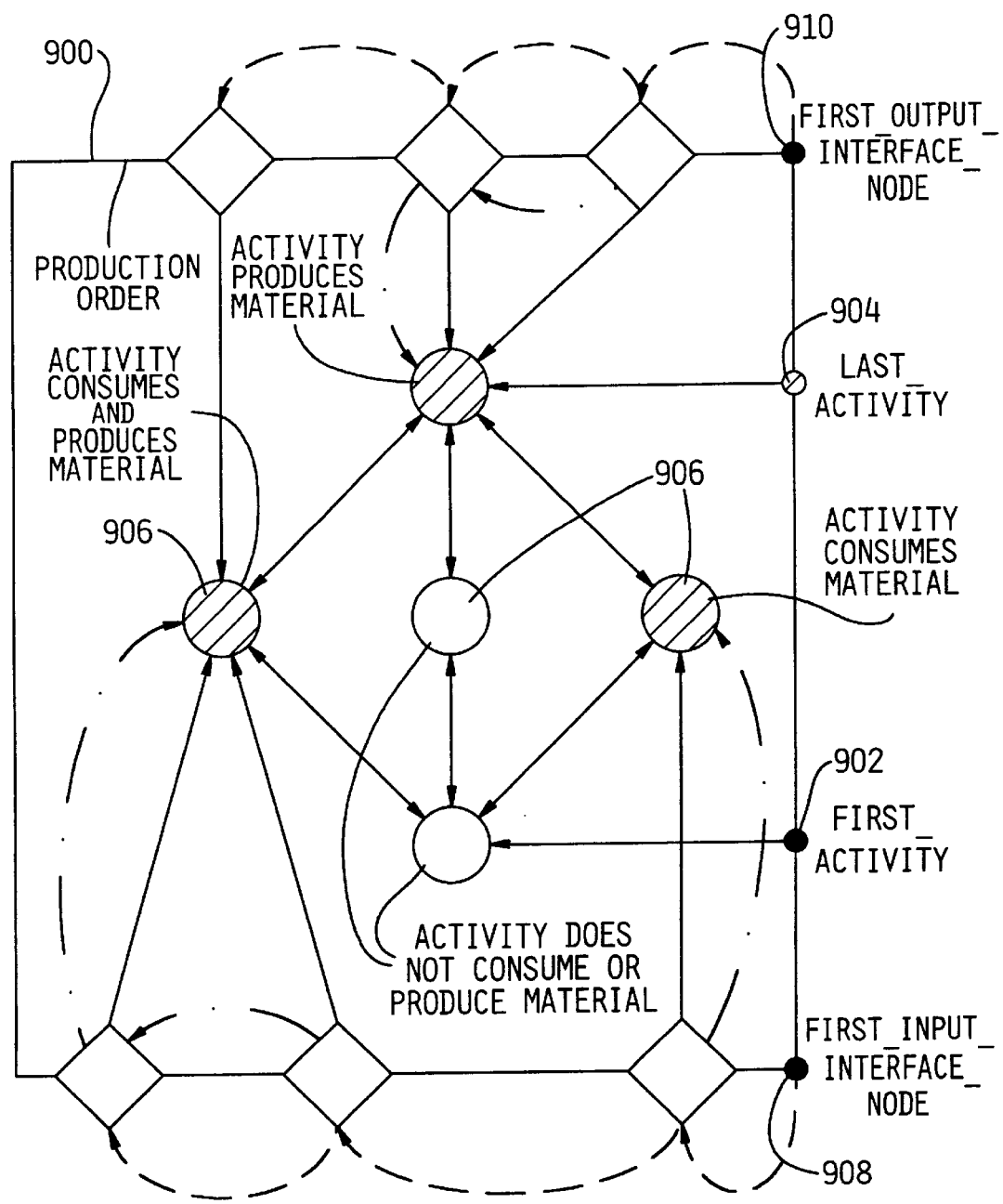
FIG. 9 is a diagram of a sample optimized data structure which can be defined as a UDT in the present invention.
Figure 10:
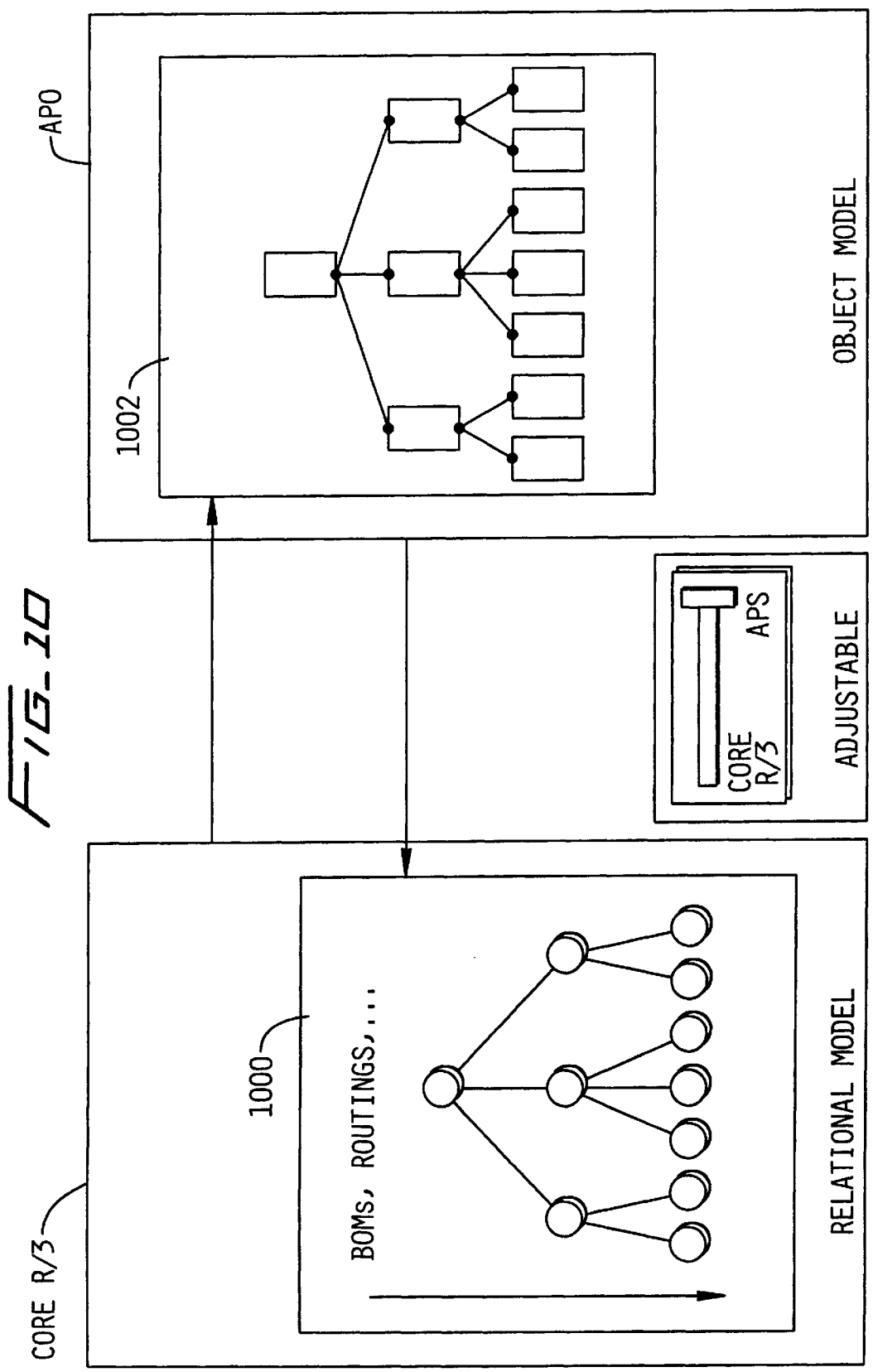
FIG. 10 is diagram of the mapping of data from a relational to an object-oriented model.
Figure 11:
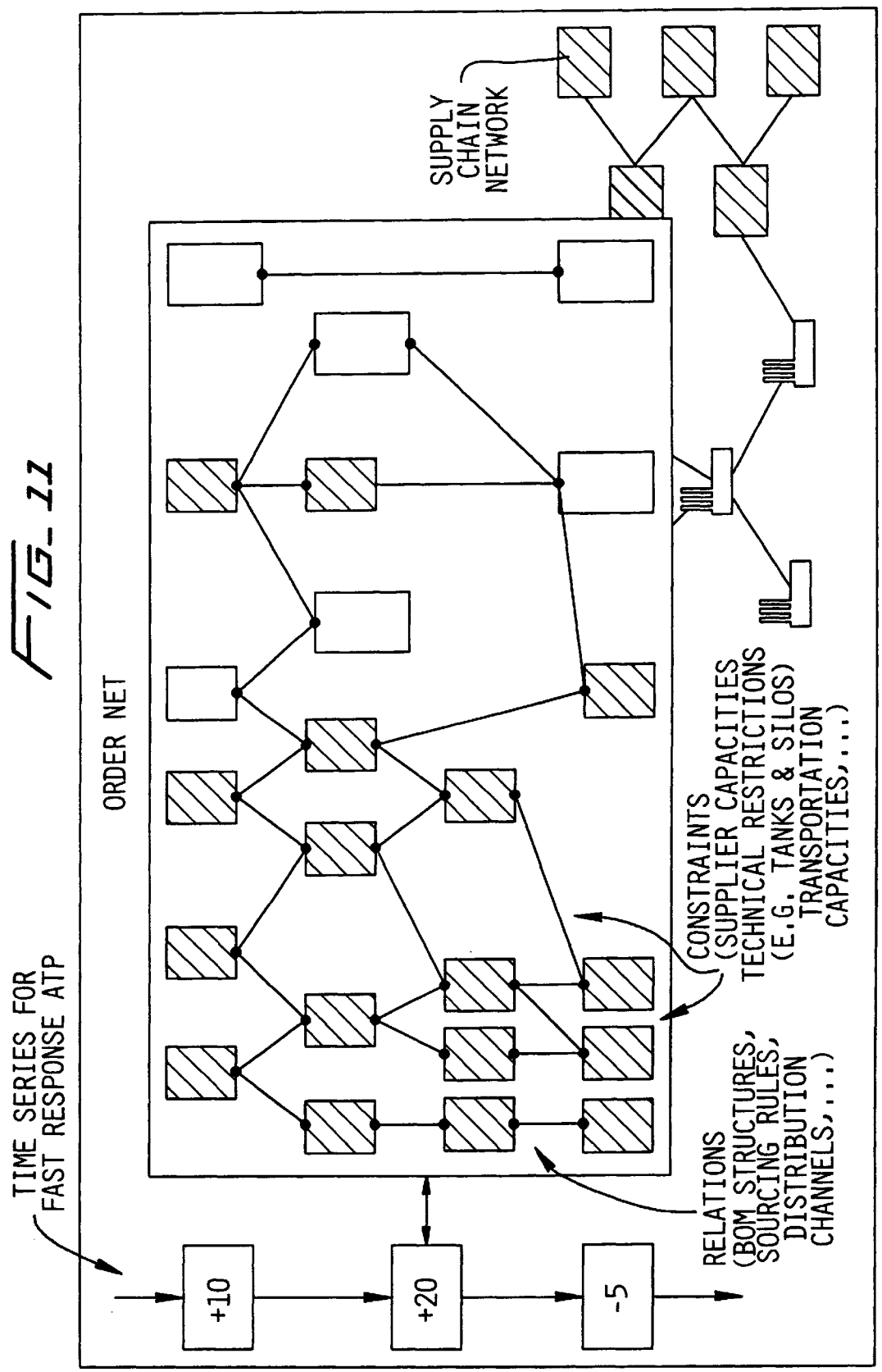
FIG. 11 is an example of a planning model constructed of the optimized data structures depicted in FIG. 9.

Stored procedures are implemented as methods of the COM object which are stored in COM storage container 818. The present invention allows the user to create a persistent C++ class which is an object class, and store it in OMS 802. The object class is an object-oriented optimized data structure for storing the relational data imported from the main ERP database. Optimized data structures are another representation of the relational data imported from the main ERP database. Data stored as objects according to this data structure are instances of the object class. FIG. 9 depicts an example of an optimized data structure. In the preferred embodiment, the optimized data structure is the one referenced in U.S. patent application Ser. No. 09/033840 filed on Mar. 3, 1998 and is suitable for use with the present invention. FIG. 9 depicts Production Order 900 which is stored as an object in object data storage 814 and is composed of a network of activities. The network has first activity 902 and last activity 904 with intermediate activities 906. There is a First_Input Interface_Node 908 where input parameters are provided as well as a First_Output Interface_Node which provides the result of Production Order 900. The activities and links between them are stored in ERP database server 602 in traditional relational format in tables. This traditional relational data 1000 is transferred to the livecache server and is mapped into optimized data structure 1002, an example of which is the one depicted in FIG. 9. These individual Production Orders are linked together to form an order net as depicted in FIG. 11. FIG. 12 depicts an example of a scenario which could be mapped to the data model depicted in FIG. 9. Network 1200 is comprised of three tiers: plants 1202, distribution centers 1204, and customer demand 1206. These object-oriented data models stored in object storage container 814 in main memory 800 facilitate data access and allow rapid execution of functions on them. There can be several classes within the network. There can be references from objects of one class to objects of another class. Each stored procedure is associated with a particular object class and operates only on instances of that object class, however each object class can have more than one stored procedure. The stored procedures are written in C++ and implemented as methods of a COM object as described above.

The method chosen to implement the liveCache differs from the approaches used in existing ORDBMSs. In these prior methods, the flat data structures (tables) have been enhanced with complex data types. Because the data in these systems are accessed exclusively through SQL, the local SQL implementation has been extended with language constructs that enable access to complex data. Accordingly, network-like structures 1200 as shown in FIG. 12 must be pushed into relational patterns (tables). In the present invention, data modeling of the relational environment and the object-oriented environment remain separate. SQL is available for modeling and working in the relational environment, while a liveCache class (in the form of a C++ class) exists for modeling and working in the object-oriented environment. The complex objects are stored in separate storage container 814 distinct from relational database storage structure 816.

The user defines said object class such as the one discussed above as a persistent C++ class. Such definition occurs through object management C++ functions of OMS 802 such as the CREATE or STORE function. The operations supported by OMS 802 include the following: Retrieve stored object, Replace stored object, Add a stored object, Remove stored object, Create a new type, and Destroy an existing type and all instances of that type. There is an OMS Class which contains all functions which are used to create and manipulate object oriented data. After the object class has been defined, all relational data that is modeled based on this object class is stored as instances of the persistent C++ class in object storage container 814. OMS Basis 806 manages the storage of these objects. FIG. 13 is a diagram of the OMS architecture. OMS 1300 is linked to OMS basis 1302 which is in turn connected to data cache 1304. Note that this is the same OMS referenced previously as 802. Private OMS Caches 1306 are memory addresses where processes are carried out. Each private OMS Cache 1306 is dedicated to one particular user session. When multiple users access the liveCache system, they are assigned their own private OMS Cache 1306 to process their requests. They also have their own separate instances of the stored procedures running for each user sessions. Within the stored procedure is a call to the object management methods of the OMS. C++ methods 1308 are linked to both the OMS 1300 and private OMS Cache 1306. The object management methods retrieve the object data into the private OMS Cache. If the data is already in the private OMS Cache, this step is bypassed.

The functionality of OMS Basis 1302 is explained in the following. It uses storage technology known in the prior art which will be briefly described below. As shown in FIG. 14, OMS Basis 806 consists of page chains 1400 for each object class. It is the component responsible for all input/output operations between data cache 1304 and private OMS cache 1302. As such it needs to be aware of physical memory addresses. As shown in FIG. 15, object data are stored in pages in object storage container 814. For example, when OMS 1300 asks to retrieve some specific data object on specific page p 1500, the OMS Basis needs to know exactly where page p 1500 is in the main memory. However, the user of OMS Basis 1302, OMS 1300, does not need to know that information. Instead, the OMS regards the memory simply as a logical collection of page sets, each one consisting of a collection of fixed size pages. Each page chain corresponds to a particular set of objects stored according to an object class. FIG. 14 depicts the storage architecture of the OMS Basis. Class a 1400 corresponds to a particular optimized data structure defined by an object class. Class a 1400 is further subdivided into containers a1 1402 which is further comprised of individual page chains a1.1 1406, a1.2 1408, a1.3 1410, and a1.4 1412. It is also comprised of container a2 1404, which is further comprised of individual page chains a2.1 1414, a2.2 1416, a2.3 1418, and a2.4 1420. Each page, in turn, is identified by page number that is unique within the memory. Distinct page sets are disjoint (i.e. do not have any pages in common). The mapping between page numbers and physical memory addresses is understood and maintained by OMS Basis 1302.

The OMS uses the OMS Basis in such a way that the user regards the memory as a collection of stored objects. Each page will contain one or more stored objects 1504. Each stored object 1504 is identified by object identification (OID) 1506. The OID consists of page number 1502 and some value unique to that page, in this embodiment, page offset 1504. The OID of the persistent C++ objects contains the page address for the corresponding record (8 bytes total length: 4 bytes page number, 2 bytes slot no, 1 bytes class ID, and 1 byte version). The internal page offset can be calculated from the slot position and the fixed record length. The OID contains logical object addresses, not physical object addresses. The OID 1600 of the preferred embodiment is depicted in FIG. 16. It is comprised of data page number 1602, data page offset 1604, class id 1606, and version 1608. Data page number 1602 references the data page of the object, hashed to a data cache address. Data page offset 1604 is the offset of the object on the data page. Class id 1606 identifies which particular class the object belongs to. Applications will always use the OID to gain valid access to the object.

The following is a simplified example of the storage mechanism of the livecache. See FIG. 17 for the following discussion. Imagine that the database has no data at all. There is only one page set 1700, the free space page set, which contains all four pages 1702–1708 on the disk. The pages are numbered sequentially from one. Imagine that five objects fit on one page. In the preferred embodiment, each page will hold a plurality of objects. For instance, we want to store ten supplier objects 1710–1730. The OMS registers the class thereby creating object container 1716. First, the OMS requests the creation of "supplier object page set" 1714 for supplier objects. It registers the class with hash key. A new instance of the class is created along with a corresponding OID. The OMS basis removes pages 1–2 1702, 1704 from the free space page set and labels them "supplier object page set." Ten supplier objects 1710–1730 are stored in the two pages. In this situation, if the OMS inserts a new supplier object, the OMS Basis locates the first free page from the free space page set and adds it to "supplier object page set." If the OMS deletes stored object, the OMS Basis marks the space as available (delete flag in the page) and the space is recorded as available in a chain of available spaces. When all the objects on a page have been deleted, this page can be passed on to page management.

Inserts are made in the first free object frame. There is a chain of pages that contains free object frames. Any page that has a free object frame will be part of that chain. Updates do not need any additional memory, and thus do not cause any overloads from within the memory. New inserts first use the positions of deleted records before they request space at the end of the container and eventually a new page. Optionally, it can be defined for the type that new entries can only be inserted at the end. In this case, the space from the deleted entries are not reused. Completely blank pages are removed from the chain and returned to the free space page set.

The logical sequence of pages in a given page set must be represented, not by physical adjacency, but by pointers as shown in FIG. 18. In this figure there is a sequence of pages. Each page will contain page header 1800, a set of control information that includes the memory addresses of the page that immediately follows that page in logical sequence. The page with page header 1800 may not be physically adjacent to the next logical page with page header 1802. The page headers are managed by the OMS basis, and as such, are invisible to the OMS. Only the objects are visible to the OMS.

In summary, the OMS basis provides page management for the persistent object containers. It is comprised of double linked chains of fixed size data pages. Note that a single class may consist of several containers. It may be partitioned by class attribute. The class 1606 also contains the container id which tells the OMS in which container the object is located. The objects are stored in fixed length object frames (records) because all instances of a C++ class have the same size. It provides access to consistent object states via the log. The object frames are reused. Empty object frames are kept in a separate free chain. The maximum object length is restricted by the size of a data page.

Figure 19:
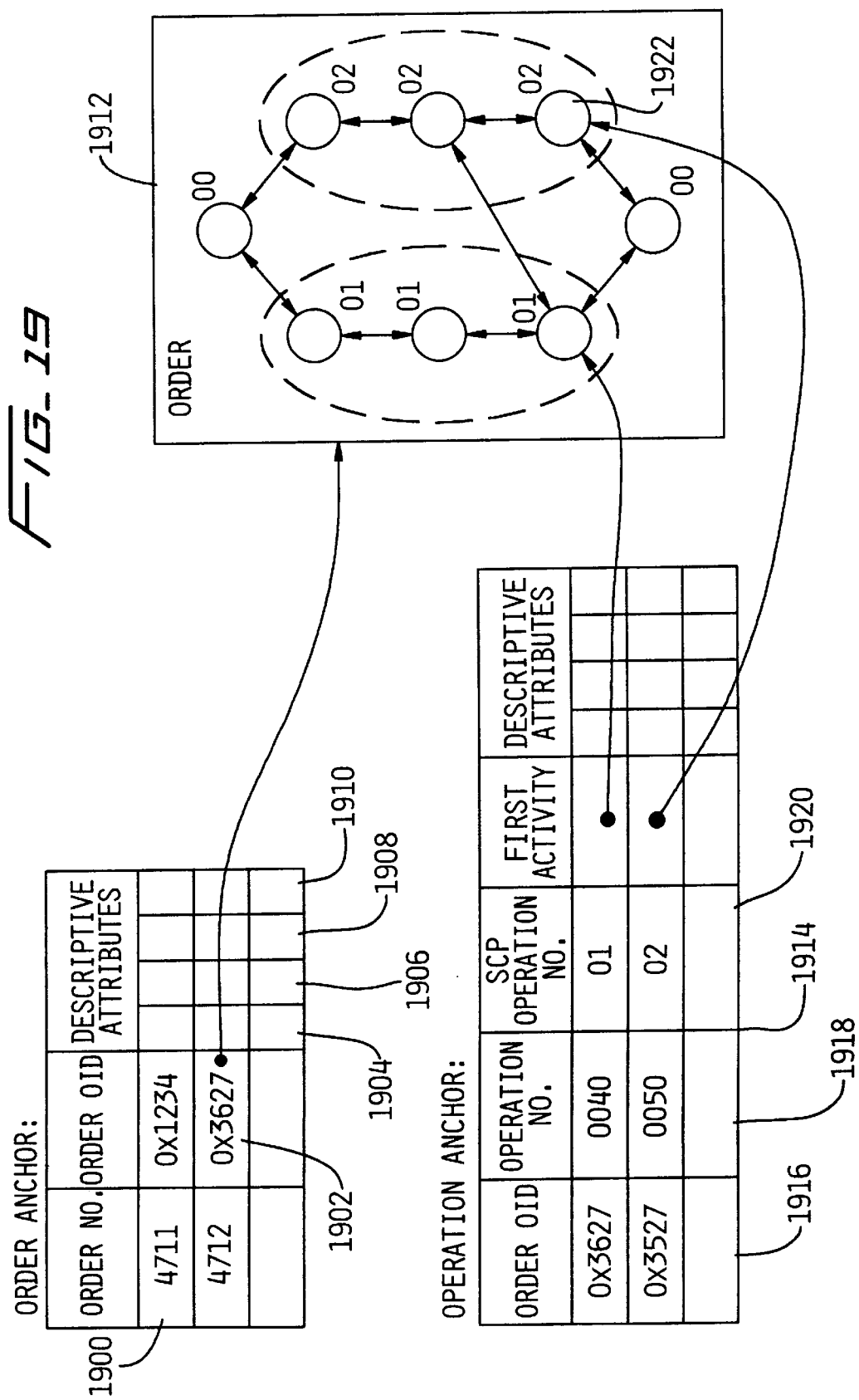
FIG. 19 illustrates the OID of the optimized data model which is suitable for use in the present invention.

In the preferred embodiment using the optimized data structure discussed above, the OID for each object instance is stored in traditional relational format. FIG. 19 depicts the relational table structure for the storage of the OIDs. There is key value column which is comprised of the order number 1900. Corresponding OID 1902 is stored as a second column in the table. There are further columns 1904–1910 which can be used to store object attributes. OID 1902 points to order object 1904 stored in the object storage container 814. If the user wants access to the activities within the order object 1912, there may be additional table 1914 comprised of first column 1916 with the OID, second column 1918 with the operation number, third column 1920 with another order number, and pointers to activities 1922.

Figure 20:
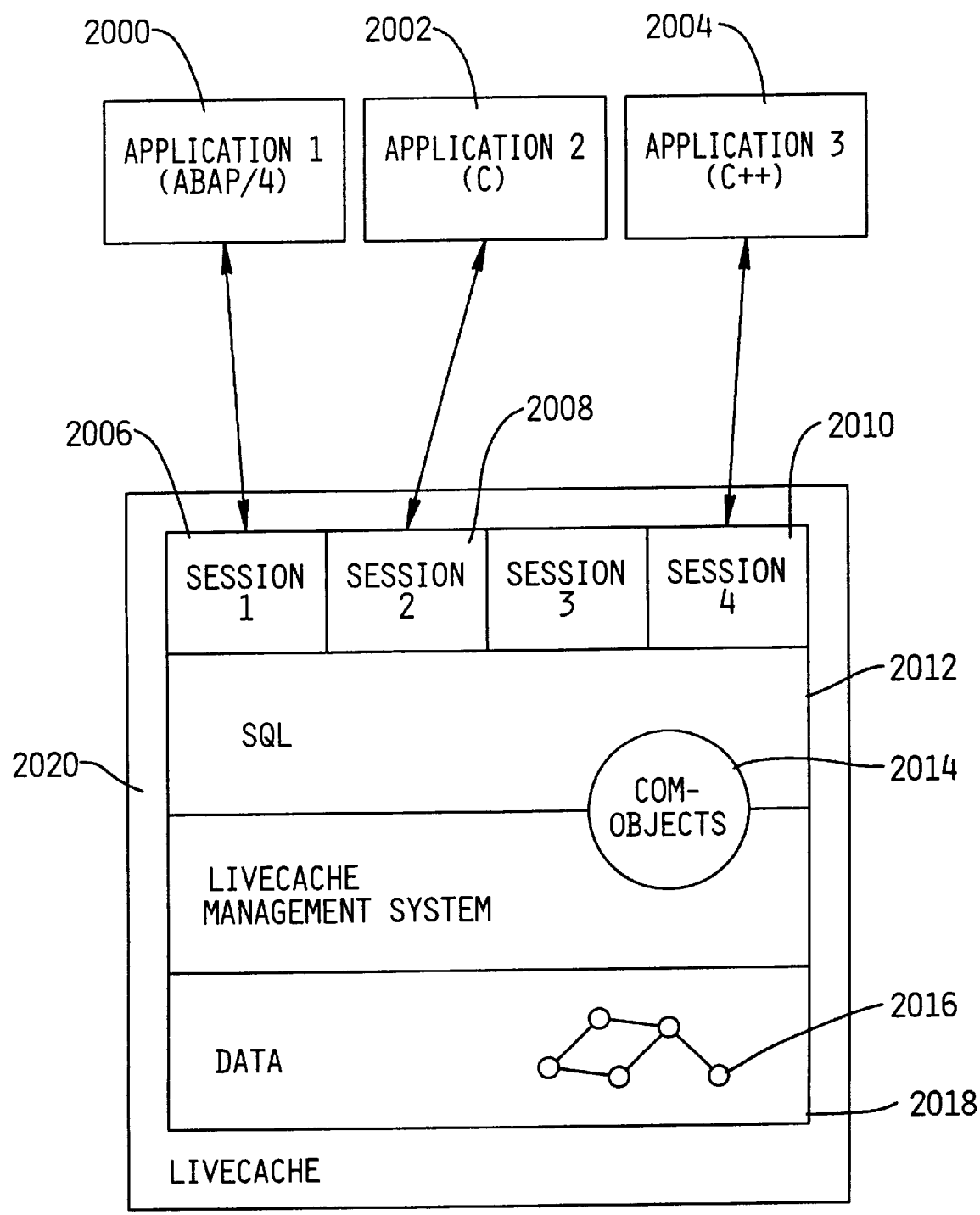
FIG. 20 illustrates the interface between application objects and the liveCache server.
Figure 21:
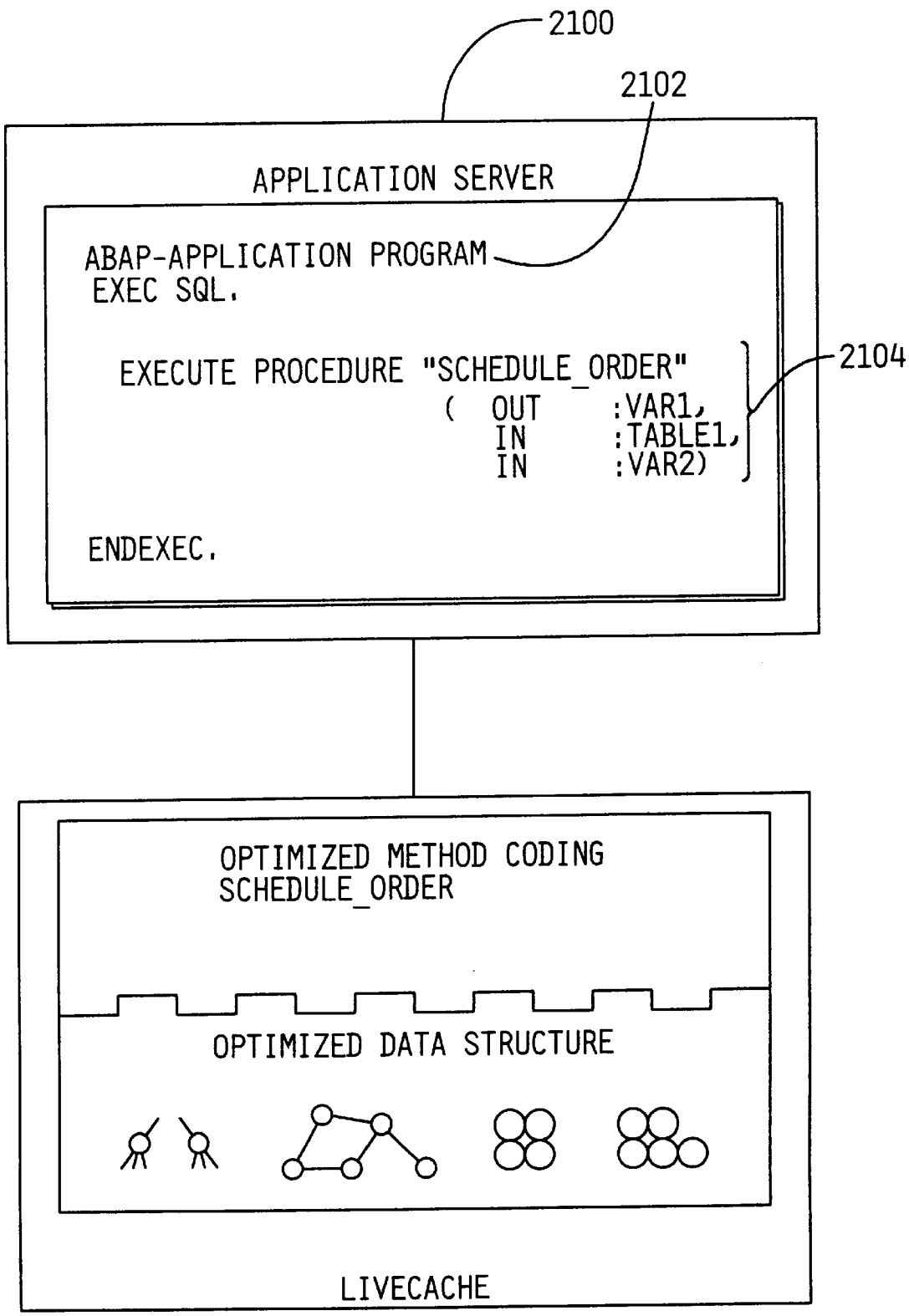
FIG. 21 illustrates the method of issuing an SQL query to the liveCache server to retrieve functions and object data.

Once the relational data has been mapped to the optimized data structures and stored as objects via OMS 802 in object storage container 804 and the stored procedures have been stored in the COM object container and registered with the registry, the user may query the liveCache system for processing of data. The data is queried through the stored procedures which calls the object management methods. FIG. 20 gives another overview of the present invention. Applications 2000, 2002, 2004 query the liveCache through their respective private sessions 2006, 2008, 2010 through the stored procedures. The queries are interpreted in SQL layer 2012 to call the corresponding methods of COM Objects 2014 as well as data 2016 in data layer 2018 via OMS layer 2020. Stored procedures will access data that is part of the private OMS Cache, and it is up to the OMS to retrieve the data from the data cache into the private OMS cache. The Application invokes liveCache functionality through SQL by calling stored procedures. The COM Objects written in C++ are linked with the OMS layer into the appropriate private OMS Cache so there is no data transfer between address spaces. As shown in FIG. 21, in Application Server 2100 the ABAP Application Program 2102 issues sql query 2104 which calls the function from the COM Object storage where it is dynamically linked into the private OMS Cache assigned to that particular ABAP Application Program 2102. This sql query comprises a call to the stored procedures which is stored as a method of a COM object. The object data is called from within the stored procedure. There are two parts to the SQL query in the preferred embodiment. The stored procedure is called and dynamically linked to the liveCache kernel. The dynamic linking makes it possible to operate on the data without costly address space switching. The private OMS Cache is part of the instance of the COM object. The COM object is the environment where the private OMS Cache is located. The query will include some set of objects that are necessary for the processing. The query will call the data objects through some reference, such as Production order number 900. The number is found and the corresponding OID is located in table 2104. The OID is then mapped to a physical memory address at which point a copy of the object is made available in the same address space where its associated stored procedure has been made available. The parameter data types to be inputted into the functions can be either scalar C++ data types (int, float, char, arrays, etc.), flat structures, or internal ABAP tables.

For enhancing the speed in which the liveCache server stores, retrieves, and presents particular objects, the server maintains one or more database indexes on the table. A database index, typically maintained as a B-Tree data structure, allows the records of a table to be organized in many different ways, depending on the user's particular needs. An index may be constructed as file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. These trees are stored in the SQL basis 808 shown in FIG. 8. Another option is to assign a hash key to the persistent C++ class. In this case, the OMS will provide a hash index for the transformation of the key to an OID. You can reference your object via key or OID.

The OMS Cache provides a private cache for persistent objects which are session specific. The OID is mapped to a cache address where the object is located. The fist access to an object is via the OMS Basis at which point an object copy is placed in the private cache. Subsequent accesses use the object copy in the private cache by hashing the OID to a memory address within the private cache.

When the object data is retrieved from the storage by OMS and OMS Basis as per the mechanism explained above, the preferred embodiment also provides sophisticated transaction management similar to that used in relational models through the Object Management System (OMS). Such management is well known in the prior art, however a brief description of the preferred embodiment is provided below.

A transaction is a logical unit of work. Where a transaction is comprised of two updates, it is clear that it must not be allowed for one update to be executed and the other not because this would leave the database in an inconsistent state. The system component that provides this atomicity is the Object Management System, the equivalent of a transaction manager in traditional systems. The OMS has two integral operations COMMIT and ROLLBACK.

The COMMIT transaction signals successful end-of-transaction. It tells the OMS that a logical unit of work has been successfully completed, the database is in a consistent state again, and all of the updates made by that unit of work can now be committed or made permanent. The ROLLBACK transaction signals unsuccessful end-of-transaction: it tells the transaction manager that something has gone wrong, the database might be in an inconsistent state, and all of the updates made by the logical unit of work so far must be "rolled back" or undone. If either of the two updates raises an error condition, a ROLLBACK is issued to undo any changes made so far. The OMS maintains log 810, as depicted in FIG. 8 above on disk on which details of all update operations—in particular, before and after values of the updated object—are recorded. Thus if it becomes necessary to undo some particular update, the OMS can use the corresponding log entry to restore the updated object to its previous value.

The transaction begins with the successful execution of a begin transaction statement, and it ends with the successful execution of either a COMMIT or a ROLLBACK statement. COMMIT establishes a commit point. A commit point corresponds to the end of a logical unit of work. ROLLBACK, in contrast, rolls the database back to the state it was in at BEGIN. When a commit point is established, all changes since the previous commit point are made permanent. If a transaction successfully commits, then the OMS will guarantee that the updates will be permanently installed in the database, even if the system crashes immediately. The OMS system's restart procedure will install those updates in the database; it is able to discover the values to be written by examining the relevant entries in the log.

The OMS of the preferred embodiment has several access methods. "Deref Object" references an object in the OMS cache. "Deref Object by Key" copies an object referenced via the hash index into the OMS cache. "Scan Object" returns next object from the object container. "Lock Object" locks the object. "Refresh Object" copies, if necessary, the newest state of an object into the OMS Cache. "Release Object" deletes an object from the OMS Cache.

The operations of session management are implemented as methods of a C++ class. There are three types of transaction modes in the preferred embodiment. In implicit mode, locks are requested implicitly and the OMS sets locks for object copies in the private cache. In optimistic mode, "Deref Object" uses the consistent view. Furthermore, Lock and Store operations are restricted to the private cache level and no liveCache data will be changed. In pessimistic mode, "Deref Object" still uses the consistent view, however, Lock and Store operations affect shared objects immediately. In a consistent view, the complete object data is "virtually" frozen at the beginning of the transaction (primsh, 17).

Figure 22:
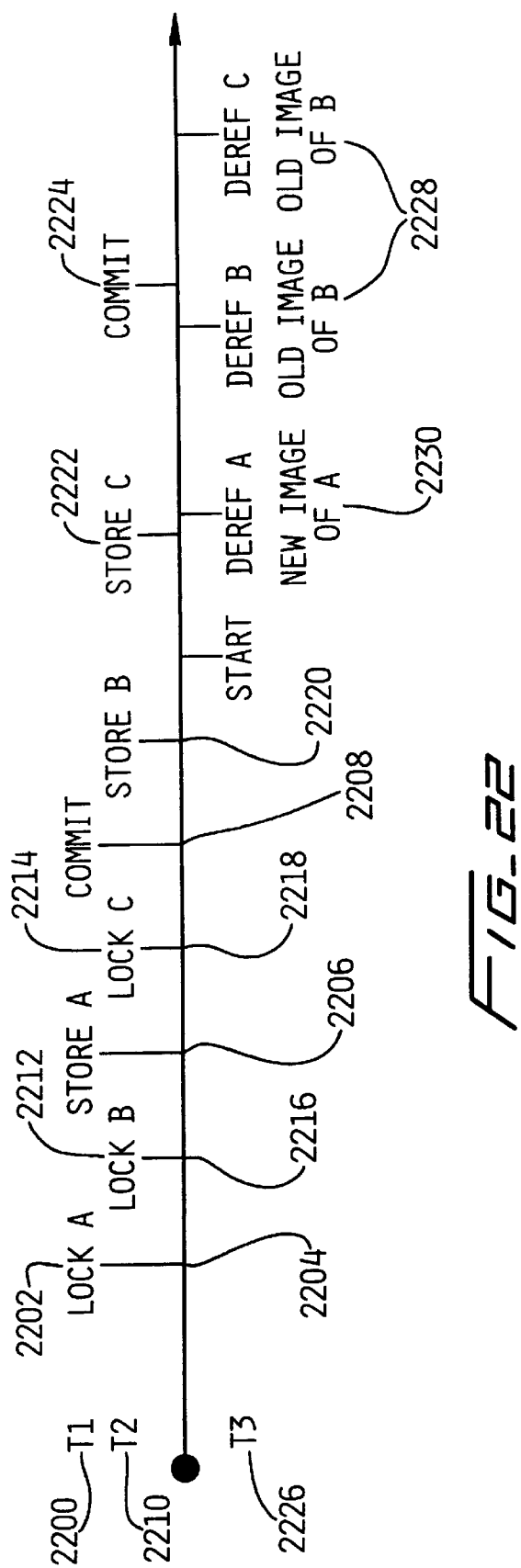
FIG. 22 is a diagram of the transaction management system of the present invention.
Figure 23:
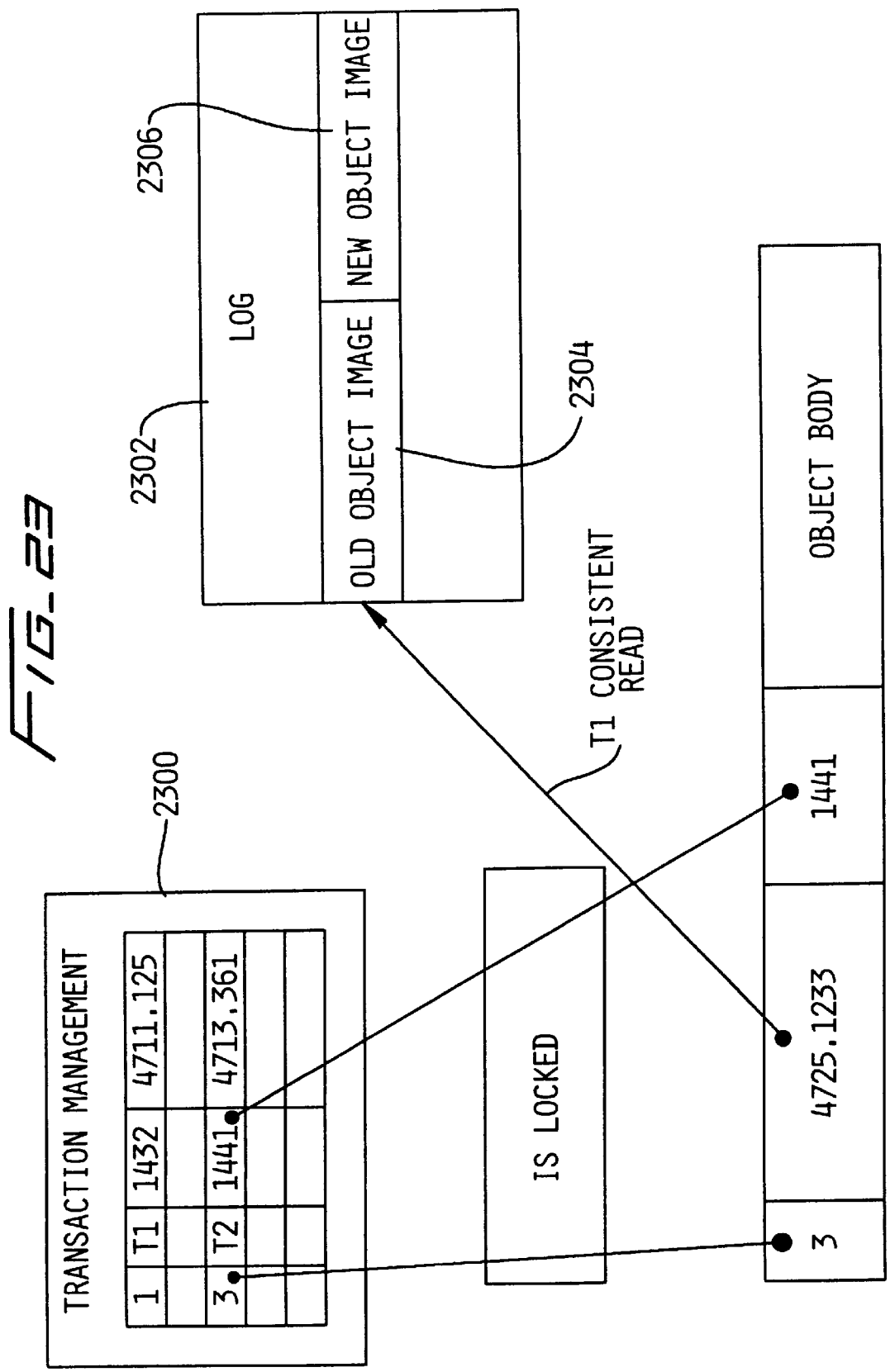
FIG. 23 is an illustration of the log for the transaction management system of the present invention.

FIG. 22 is an example of the transaction management describe above. When transaction 1 2200 requires object A 2202, it is locked 2204. After completion of the processing, object A 2202 is stored again 2206. After the store function is completed, the transaction is committed 2208. Transaction 2 2210 requires object B 2212 and object C 2214 for processing. They are both locked 2216, 2218 during processing. After said processing, they are both stored 2220, 2222, after which the transaction is committed 2224. Transaction 3 2226 requires object A 2202, object B, 2212, and object C 2214 for processing. However, since it begins before Transaction 2 has committed 2226, it must proceed with an old image of both B and C 2228. It can proceed with latest image of A 2230. Log 810 is shown in FIG. 23. Transaction management table 2300, as known in the prior art, is depicted. Log file 2302 stores both old object image 2304 and new object image 2306 until the transaction is committed.

The system is also capable of data synchronization after the initial population of the liveCache. After the initial transfer of data from main ERP database 702 to liveCache server 706 upon activation of the liveCache, data in the liveCache is kept updated to mirror the data in the main ERP database. As transactions occur in ERP system 700, these transactions are written to ERP database 702 to reflect changes in inventory level, resource availability subsequent to each transaction. These data changes are simultaneously made to the data being held in the main memory of the liveCache server via the C++ functions of the OMS.

Figure 24:
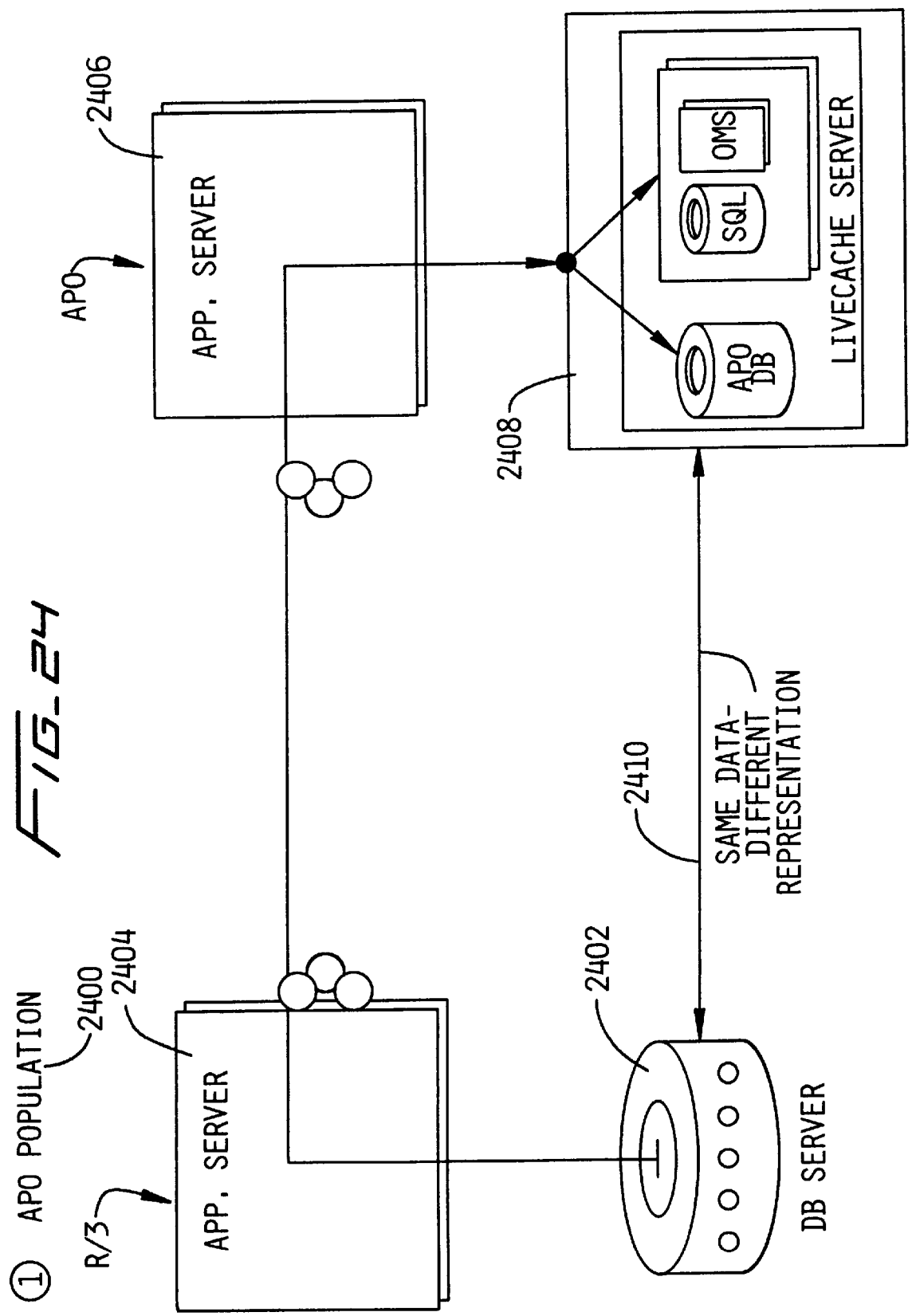
FIG. 24 is step one of the data synchronization means of the present invention.
Figure 26:
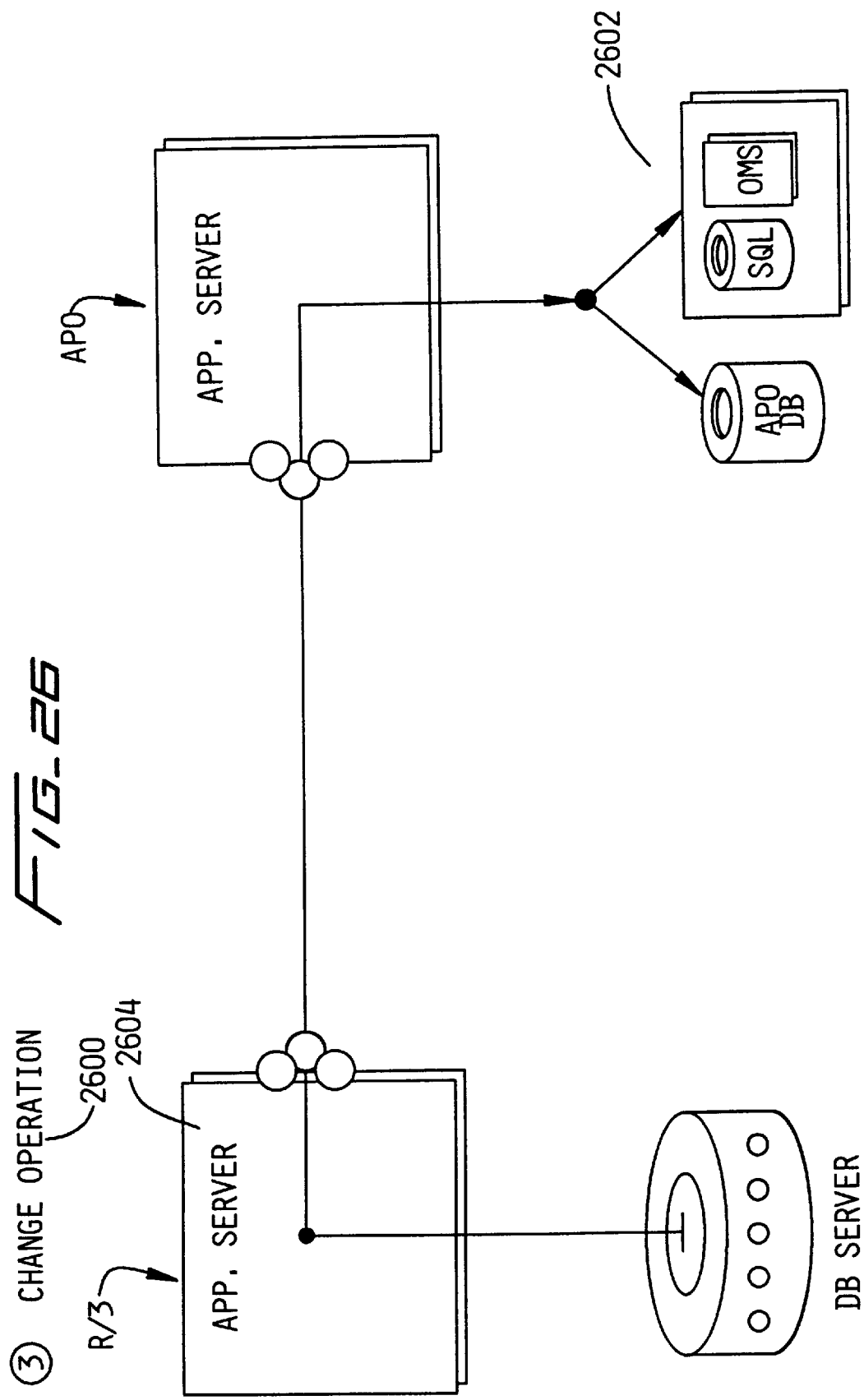
FIG. 26 is step three of the data synchronization means of the present invention.

Initially, as shown in step 1 2400 of FIG. 24, the data from the DB Server 2402 is transferred through ERP software 2404 through Application Server 2406 to livecache server 2408 where it is transferred into optimized data structure 2410. Step 2 2500 shown in FIG. 25 depicts the two way flow of data from liveCache server 2502 to ERP software 2504 and then to DB server 2506 which occurs when the liveCache generates a plan per the request of Application server 2508 which must be effected. Finally, step 3 2600 shown in FIG. 26, shows how the data in liveCache server 2602 is kept updated as transactions are processed by ERP software 2604. As noted above, the data in the liveCache is overwritten so as to minimize memory requirements.

What is claimed is:

1. A method for storing and executing at least one stored procedure on a data object in a database management system comprising the steps of:
   a) defining at least one object-oriented optimized data structure as a persistent class of an object oriented programming language in said database management system;
   b) mapping relational data into said at least one object-oriented optimized data structure;
   c) storing said relational data as said data object which is an instance of said persistent class;
   d) storing said data object in a physical memory;
   e) generating an object identifier unique to said data object;
   f) storing said object identifier in an SQL table;
   g) defining said at least one stored procedure as a method of a COM object stored in a COM object container;
   h) calling said at least one stored procedure through an SQL query provided by an application program;
   i) providing said at least one stored procedure with a plurality of input parameters;
   j) executing said database management system in an address space;
   k) dynamically linking said at least one stored procedure to an address space in which said database management system is executing;
   l) providing a copy of said data object in said address space; and
   m) executing said at least one stored procedure upon said data object.

2. The method of claim 1 wherein said database management system and said data object are both stored in a main memory of a computer system.

3. The method of claim 2 wherein said object-oriented programming language is C++.

4. The method of claim 3 further comprising the steps of:
   a) storing said relational data in a data cache;
   b) providing an object management system for executing C++ functions;
   c) managing the storage of said data object through an object management system basis; and d) providing a private object management cache for executing said at least one stored procedure.

5. The method of claim 4 further comprising the steps of:
a) assigning said private object management cache to each one of a plurality of users;
b) providing a separate instance of said at least one stored procedure in said private object management cache for each one of said plurality of users;
c) providing a separate instance of said data object for each one of said plurality of users in said private object management cache; and
d) executing said separate instance of said at least one stored procedure on said separate instance of said data object.

6. The method of claim 4 wherein said managing the storage of said data object further comprises the steps of:
a) providing a page chain comprising a plurality of pages corresponding to said persistent class;
b) storing said data object in said plurality of pages;
c) creating a table with a page number and a unique value for said page number that corresponds to said object identifier unique to said data object;
d) receiving a request from a user interface for said data object;
e) mapping said object identifier to said physical memory where said data object is stored; and
f) retrieving said data object.

7. The method of claim 6 further comprising the step of providing a database index to facilitate said retrieving of said data object.

8. The method of claim 7 wherein said database index is a B-tree data structure.

9. The method of claim 3 further comprising the steps of:
a) managing said executing said at least one stored procedure;
b) executing a commit transaction after completion of said executing said at least one stored procedure;
c) executing a rollback transaction when said executing said at least one stored procedure remains uncompleted;
d) recording said commit transaction and said rollback transaction in a log in said object management system;
e) recording a state of said data object before said executing said at least one stored procedure; and
f) retrieving said state of said data object before said executing said at least one stored procedure after said recording of said rollback transaction.

10. A system for storing and executing at least one stored procedure on a data object in a database management system comprising:
a) means for defining at least one object-oriented optimized data structure as a persistent class of an object oriented programming language in said database management system;
b) means for mapping relational data into said at least one object-oriented optimized data structure;
c) means for storing said relational data as said data object which is an instance of said persistent class;
d) means for storing said data object in a physical memory;
e) means for generating an object identifier unique to said data object;
f) means for storing said object identifier in an SQL table;
g) means for defining said at least one stored procedure as a method of a COM object stored in a COM object container;
h) means for calling said at least one stored procedure through an SQL query provided by an application program;
i) means for providing said at least one stored procedure with at least one of a plurality of input parameters;
j) means for executing said database management system in an address space;
k) means for dynamically linking said at least one stored procedure to an address space in which said database management system is executing;
l) means for providing a copy of said data object in said address space; and
m) means for executing said at least one stored procedure upon said data object.

11. The system of claim 10 wherein said database management system and said data object are both stored in a main memory of a computer system.

12. The system of claim 4 wherein said object-oriented programming language is C++.

13. The system of claim 12 further comprising:
a) means for executing C++ functions;
b) means for managing the storage of said data object; and
c) means for providing a private object management cache for said executing said at least one stored procedure.

14. The system of claim 13 further comprising:
a) means for assigning said private object management cache for each one of a plurality of users;
b) means for providing said separate instance of said at least one stored procedure in said private object management cache for each one of said plurality of users;
c) means for providing a separate instance of said data object in said private object management cache for each one of said plurality of users; and
d) means for executing said separate instance of said at least one stored procedure on said separate instance of said data object.

15. The system of claim 13 wherein said means for managing the storage of said data object further comprises:
a) means for providing a page chain comprising a plurality of pages corresponding to said persistent class;
b) means for storing said data object in said plurality of pages;
c) means for creating a table with a page number and a unique value for said page number that corresponds to said object identifier of said object;
d) means for receiving a request from a user interface for said data object;
e) means for mapping said object identifier to said physical memory where said data object is stored; and
f) means for retrieving said data object.

16. The system of claim 15 further comprising means for database indexing to facilitate said retrieving said data object.

17. The system of claim 16 wherein said means for database indexing is a B-tree data structure.

18. The system of claim 12 further comprising:
a) means for managing each said executing said at least one stored procedure;
b) means for executing a commit transaction after completion of said executing said at least one stored procedure;

c) means for executing a rollback transaction when said executing said at least one stored procedure remains uncompleted;

d) means for recording said commit transaction and said rollback transaction in a log in said object management system;

e) means for recording a state of said data object before said executing said at least one stored procedure; and f) means for retrieving said state of said data object before said executing said at least one stored procedure after said recording said rollback transaction.

19. A system for storing and executing at least one stored procedure on a data object in a database management system comprising:

a) a database for storing amounts of relational data;

b) a first interface for defining at least one object-oriented optimized data structure as a persistent class of an object oriented programming language for said relational data;

c) a second interface for mapping said relational data into said at least one object-oriented optimized data structure;

d) a third interface for defining said at least one stored procedure as a method of a COM object;

e) a COM library for storing said at least one stored procedure;

f) an application program from which a user interface calls said at least one stored procedure through an SQL query from said COM library; and g) a main memory for storing said relational data as said data object which is an instance of said persistent class and for executing said at least one stored procedure on said data object.

20. The system of claim 19 wherein said object oriented programming language is C++.

21. The system of claim 19 further comprising an SQL table for storing an object identifier unique to said data object.

22. The system of claim 21 further comprising:

a) an object management system for executing C++ functions;

b) an object management system basis for managing storage of said data object; and c) a private object management cache for said executing said at least one stored procedure.

23. The system of claim 22 wherein said object management system basis further comprises:

a) a page chain comprising a plurality of pages corresponding to said persistent class for said storage of said data object;

b) a table for storing a page number and a unique value corresponding to said page number that corresponds to said object identifier unique to said data object;

c) a fourth interface for inputting a request from said user interface for said data object; and d) a fifth interface for mapping said request to said physical memory where said data object is stored and for retrieving said data object.

24. The system of claim 23 further comprising a database index for facilitating said retrieving said data object.

25. The system of claim 24 wherein said database index is a B-tree data structure.

26. The system of claim 19 further comprising a system for managing said executing said at least one stored procedure comprising:

a) a log file for storing a commit transaction after completion of said executing said at least one stored procedure;

b) a log file for storing a rollback transaction when said executing said at least one stored procedure remains uncompleted;

c) a database file for recording a state of said data object before said executing said at least one stored procedure; and d) a subsystem for retrieving said state of said data object before said executing said at least one stored procedure after said storing said rollback transaction.

27. A method for storing and executing at least one stored procedure on a data object in an R/3 system comprising the steps of:

a) defining at least one object-oriented optimized data structure as a persistent class of an object oriented programming language in said R/3 system;

b) mapping transactional data from said R/3 system into said at least one object-oriented optimized data structure;

c) storing said transactional data from said R/3 system as said data object which is an instance of said persistent class;

d) storing said data object in a physical memory;

e) generating an object identifier unique to said data object;

f) storing said object identifier in an SQL table;

g) defining said at least one stored procedure as a method of a COM object stored in a COM object container;

h) calling said at least one stored procedure through an SQL query provided by a user interface to the R/3 system;

i) providing said at least one stored procedure with a plurality of input parameters;

j) executing said database management system in an address space;

k) dynamically linking said at least one stored procedure to an address space in which a database management system module of said R/3 system is executing;

l) providing a copy of said data object in said address space; and m) executing said at least one stored procedure upon said data object.

28. A computer-readable medium having stored thereupon a plurality of instructions, said plurality of instructions includes instructions which, when executed by a processor, cause the processor to perform the steps of:

a) defining at least one object-oriented optimized data structure as a persistent class of an object oriented programming language in said database management system;

b) mapping relational data into said at least one object-oriented optimized data structure;

c) storing said relational data as said data object which is an instance of said persistent class;

d) storing said data object in a physical memory;

e) generating an object identifier unique to said data object;

f) storing said object identifier in an SQL table;

g) defining at least one stored procedure as a method of a COM object stored in a COM object container;

h) calling said at least one stored procedure through an SQL query provided by an application program;

i) providing said at least one stored procedure with a plurality of input parameters;

j) executing said database management system in an address space;

k) dynamically linking said at least one stored procedure to an address space in which said database management system is executing;

l) providing a copy of said data object in said address space; and m) executing said at least one stored procedure upon said data object.

29. The computer-readable medium of claim 28 wherein said plurality of instructions includes further instructions which, when executed by a processor, cause the processor to perform the additional steps of storing said database management system and said data object in a main memory of a computer system.

30. The computer-readable medium of claim 29 wherein said plurality of instructions includes further instructions which, when executed by a processor, cause the processor to perform the additional step of providing C++ as said object oriented programming language.

31. The computer-readable medium of claim 30 wherein said plurality of instructions includes further instructions which, when executed by a processor, cause the processor to perform the additional steps of:

a) storing said relational data in a data cache;

b) providing an object management system for executing C++ functions;

c) managing the storage of said data object through an object management system basis; and d) providing a private object management cache for executing said at least one stored procedure.

32. The computer-readable medium of claim 31 wherein said plurality of instructions includes further instructions which, when executed by a processor, cause the processor to perform the additional steps of:

a) assigning said private object management cache to each one of a plurality of users;

b) providing a separate instance of said at least one stored procedure in said private object management cache for each one of said plurality of users;

c) providing a separate instance of said data object for each one of said plurality of users in said private object management cache; and d) executing said separate instance of said at least one stored procedure on said separate instance of said data object.

33. The computer-readable medium of claim 31 wherein said plurality of instructions includes further instructions which, when executed by a processor, cause the processor to perform the additional steps of:

a) providing a page chain comprising a plurality of pages corresponding to said persistent class;

b) storing said data object in said plurality of pages;

c) creating a table with a page number and a unique value for said page number that corresponds to said object identifier unique to said data object;

d) receiving a request from a user interface for said data object;

e) mapping said object identifier to said physical memory where said data object is stored; and f) retrieving said data object.

34. The computer-readable medium of claim 31 wherein said plurality of instructions includes further instructions which, when executed by a processor, cause the processor to perform the additional step of providing a database index to facilitate said retrieving of said data object.

35. The computer-readable medium of claim 34 wherein said plurality of instructions includes further instructions which, when executed by a processor, cause the processor to perform the additional step of providing said database index in the form of a B-tree data structure.

36. The computer-readable medium of claim 30 wherein said plurality of instructions includes further instructions which, when executed by a processor, cause the processor to perform the additional steps of:

a) managing said executing said at least one stored procedure;

b) executing a commit transaction after completion of said executing said at least one stored procedure;

c) executing a rollback transaction when said executing said at least one stored procedure remains uncompleted;

d) recording said commit transaction and said rollback transaction in a log in said object management system;

e) recording a state of said data object before said executing said at least one stored procedure; and f) retrieving said state of said data object before said executing said at least one stored procedure after said recording of said rollback transaction.

* * * * *